United States Patent
Kwon

(10) Patent No.: US 12,483,356 B2
(45) Date of Patent: Nov. 25, 2025

(54) DRX METHOD AND APPARATUS FOR LINK BETWEEN NETWORK AND TERMINAL BASED ON DEVICE-TO-DEVICE COMMUNICATION IN WIRELESS COMMUNICATION SYSTEM

(71) Applicant: Innovative Technology Lab Co., Ltd., Seoul (KR)

(72) Inventor: Ki Bum Kwon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 461 days.

(21) Appl. No.: 17/934,208

(22) Filed: Sep. 22, 2022

(65) Prior Publication Data
US 2023/0019726 A1    Jan. 19, 2023

Related U.S. Application Data

(63) Continuation of application No. PCT/KR2021/002984, filed on Mar. 10, 2021.

(30) Foreign Application Priority Data

Mar. 23, 2020    (KR) .......................... 10-2020-0034914

(51) Int. Cl.
*H04W 72/14* (2009.01)
*H04L 1/1812* (2023.01)
(Continued)

(52) U.S. Cl.
CPC ....... *H04L 1/1812* (2013.01); *H04W 72/1263* (2013.01); *H04W 72/23* (2023.01); *H04W 76/28* (2018.02); *H04W 92/18* (2013.01)

(58) Field of Classification Search
CPC . H04W 72/1263; H04W 72/23; H04W 76/28; H04W 92/18; H04W 4/70;
(Continued)

(56) References Cited

U.S. PATENT DOCUMENTS 11,096,171 B2 *   8/2021   Kwak ................... H04L 5/0092
2017/0188411 A1 *   6/2017   Siomina ............ H04W 52/0216
(Continued)

FOREIGN PATENT DOCUMENTS

| KR | 10-2020-0029335 A | 3/2020 |
| WO | 2018-030832 A1 | 2/2018 |
| WO | 2020/004894 A1 | 1/2020 |

OTHER PUBLICATIONS

International Search Report for International Patent Application No. PCT/KR2021/002984, dated Jun. 25, 2021.
(Continued)

*Primary Examiner* — Atique Ahmed

(57) ABSTRACT

The present disclosure relates to a method and apparatus for discontinuous reception (DRX) for a link between a network and a user equipment (UE) based on device-to-device (D2D) communication in a wireless communication system. A method for DRX of a first UE in a wireless communication system may include receiving, from a second UE, hybrid automatic repeat request (HARQ) feedback information related to sidelink data transmitted from the first UE; transmitting, by the first UE, HARQ NACK information to a base station in an uplink based on the HARQ feedback information from the second UE; sleeping during an operation of the first timer that starts after the first UE transmits the HARQ NACK information; and monitoring a downlink control channel that includes resource allocation information on a sidelink data retransmission during an operation of a second timer that starts after the first timer expires.

18 Claims, 17 Drawing Sheets

(51) Int. Cl.
  *H04W 72/1263* (2023.01)
  *H04W 72/23* (2023.01)
  *H04W 76/28* (2018.01)
  *H04W 92/18* (2009.01)

(58) Field of Classification Search
  CPC ....... H04W 72/40; H04W 4/40; H04W 72/21; H04W 72/25; H04L 1/1812; H04L 12/0027; H04L 1/1822; H04L 1/1883
  See application file for complete search history.

(56) References Cited

U.S. PATENT DOCUMENTS

| | | | | |
|---|---|---|---|---|
| 2017/0290008 | A1* | 10/2017 | Tooher | H04W 72/23 |
| 2018/0167172 | A1* | 6/2018 | Hosseini | H04W 72/1215 |
| 2019/0386789 | A1* | 12/2019 | Fröberg Olsson | H04L 1/1812 |
| 2020/0275474 | A1* | 8/2020 | Chen | H04L 1/1848 |
| 2023/0111565 | A1* | 4/2023 | Lee | H04L 5/0094 370/329 |
| 2024/0080937 | A1* | 3/2024 | Park | H04L 1/1864 |

OTHER PUBLICATIONS

Written Opinion for International Patent Application No. PCT/KR2021/002984, dated Jun. 25, 2021.
"3rd Generation Partnership Project; Technical Specification Group Radio Access Network; NR; Physical layer procedures for control (Release 16)," Dec. 2019, pp. 1-146, 3GPP TS 38.213 V16.0.0, 3GPP Organizational Partners.
"3rd Generation Partnership Project; Technical Specification Group Radio Access Network; NR; Medium Access Control (MAC) protocol specification (Release 15)," Dec. 2019, pp. 1-78, 3GPP TS 38.321 V15.8.0, 3GPP Organizational Partners.
Huawei et al., "Discussion on HARQ support for NR sidelink", 3GPP TSG-RAN WG2 #107bis, R2-1913701, Chongqing, China, Oct. 14-18, 2019, pp. 1-17.
Panasonic, "Impact of disabling HARQ on DRX", 3GPP TSG-RAN WG2 Meeting #107bis, R2-1912570, Chongqing, China, Oct. 14-18, 2019 Revision of R2-1909277, pp. 1-4.
InterDigital, "Impact of non-numeric K1 value on DRX Timers", 3GPP TSG-RAN WG2 Meeting #107bis, R2-1912891, Chongqing, China, Oct. 14-18, 2019, pp. 1-3.
The extended European search report for Application No. 21775923.2-1218 / 4132208 PCT/KR2021002984 from European Patent Office dated Mar. 20, 2024.

* cited by examiner (a)

(b)

(a)

(b)

DRX METHOD AND APPARATUS FOR LINK BETWEEN NETWORK AND TERMINAL BASED ON DEVICE-TO-DEVICE COMMUNICATION IN WIRELESS COMMUNICATION SYSTEM

CROSS-REFERENCE TO RELATED APPLICATIONS

This application is a continuation of International patent application No. PCT/KR2021/002984, filed on Mar. 10, 2021, which claims priority from and the benefit of Korean Patent Application No. 10-2020-0034914, filed on Mar. 23, 2020, each of which is hereby incorporated by reference in its entirety.

BACKGROUND

1. Field

The present disclosure relates to a method and apparatus for discontinuous reception (DRX) for a link between a network and a user equipment (UE) in a wireless communication network and, more particularly, to a method and apparatus for DRX for a link between a network and a UE based on device-to-device (D2D) communication.

2. Discussion of the Background

Device-to-device (D2D) communication represents that a single user equipment (UE) directly communicates with another UE. Direct communication represents that a single UE communicates with another UE under control of a network or without using another network device through determination of the UE itself.

The D2D communication may apply to vehicular communication, which is generally referred to as vehicle-to-everything (V2X) communication. Vehicle-to-everything (V2X) communication may include a communication method of exchanging or sharing road infrastructures during driving and information, such as traffic conditions, through communication with other vehicles. A V2X-based service may include, for example, an autonomous driving service, a vehicular remote control service, an interactive service, such as a game, and large capacity short-range audio/video services, such as augmented reality (AR) and virtual reality (VR). Detailed techniques additionally required for Long Term Evolution (LTE) and new radio (NR) system that are radio access technology (RAT) in a 5G system is under discussion based on performance requirements for supporting various V2X-based services through the 5G system.

A discontinuous reception (DRX) (e.g., a first DRX) operation for a link (e.g., a first link) between a network and a UE may be configured in the UE. Also, D2D communication may be configured in the corresponding UE and a DRX (e.g., a second DRX) operation for a D2D communication link (e.g., a second link). In this case, to increase the overall energy efficiency of the UE, the second DRX operation for the second link needs to minimize the effect for the first DRX operation for the first link. However, so far there is no detailed method that defines the first DRX operation for the first link based on the second DRX operation for the second link.

SUMMARY

A technical objective of the present disclosure is to provide a discontinuous reception (DRX) method and apparatus that may perform device-to-device (D2D) communication in a wireless communication system.

An additional technical objective of the present disclosure is to provide a method and apparatus for DRX of a UE on a link between the UE and a base station for the UE that performs a sidelink transmission to another UE.

Technical objectives achievable from the present disclosure are not limited to the aforementioned technical objectives and still other technical objectives not described herein may be clearly understood by one of ordinary sill in the art to which the disclosure pertains from the following description.

A method for discontinuous reception (DRX) of a first user equipment (UE) in a wireless communication system according to an aspect of the present disclosure may include receiving, from a second UE, hybrid automatic repeat request (HARQ) feedback information related to sidelink data transmitted from the first UE; transmitting, by the first UE, HARQ NACK information to a base station in an uplink based on the HARQ feedback information from the second UE; sleeping during an operation of the first timer. that starts after the first UE transmits the HARQ NACK information; and monitoring a downlink control channel that includes resource allocation information on a sidelink data retransmission during an operation of a second timer that starts after the first timer expires.

The above briefly summarized features for the present disclosure are example aspects of the following detailed description of the present disclosure and do not limit the scope of the present disclosure.

According to the present disclosure, there may be provided a method and apparatus for discontinuous reception (DRX) for a user equipment (UE) that performs device-to-device (D2D) communication in a wireless communication system.

According to the present disclosure, there may be provided a method and apparatus for DRX of a UE on a link between the UE and a base station for the UE that performs a sidelink transmission to another UE.

Effects achievable from the present disclosure are not limited to the aforementioned effects and still other effects not described herein may be clearly understood by one of ordinary skill in the art to which the present disclosure pertains from the following description.

DETAILED DESCRIPTION

Figure 1:
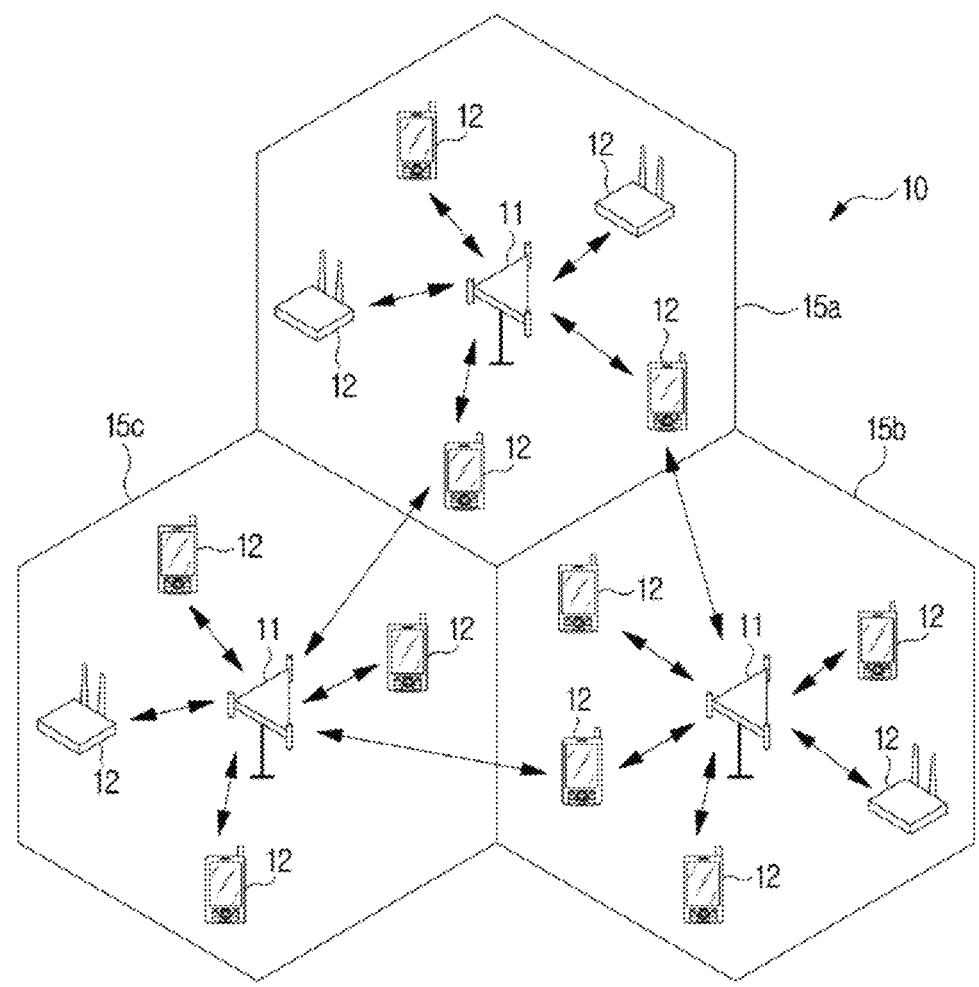
FIG. 1 illustrates an example of a wireless communication system to which the present disclosure may apply.

Various examples of the present disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

When it is determined that detailed description related to a known configuration or function in describing the examples of the present disclosure, the detailed description is omitted. Also, a part irrelevant to the description of the disclosure is omitted and like reference numerals refer to like elements.

In the present disclosure, it will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

In the present disclosure, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

In present disclosure, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

In the present disclosure, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

The terms used in this disclosure are intended to describe a particular embodiment and are not intended to limit the scope of claims. As used in the description of the examples and in the accompanying claims, the singular form is intended to include a plurality of forms as well, unless expressly indicated differently in context. In addition, the term "and/or" as used herein may refer to one of the related enumeration items, or means to refer to and include at least two or more of any and all possible combinations thereof.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

In the present disclosure, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

The definitions of abbreviations used herein are as below.
AS: Access Stratum
BSR: Buffer Status Reporting
D2D: Device to Device (communication)
DCI: Downlink Control Information
GNSS: Global Navigation Satellite System
LC or LCH: Logical Channel
MAC: Media Access Control
MCS: Modulation and Coding Scheme
RLC: Radio Link Control
RSU: RoadSide Unit
V2X: Vehicle to X(everything)
V2V: Vehicle to Vehicle
V2P: Vehicle to Pedestrian
V2I/N: Vehicle to Infrastructure/Network
SL: Sidelink
SCI: Sidelink Control Information
SFCI: Sidelink Feedback Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
ProSe: (Device to Device) Proximity Services
PPPP: ProSe Per-Packet Priority
PPPR: ProSe Per-Packet Reliability
QoS: Quality of Service
PQI: PC5 QoS Indicator Hereinafter, examples of the present disclosure may be applied to a 5G system. 5G system may be defined by including the existing Long Term Evolution-Advanced (LTE-A) system as well as the aforementioned NR system.

That is, 5G system may include not only the case where the NR mobile communication access technology is applied only, but also the case where both the LTE-based mobile communication access technology and NR mobile communication access technology are applied together.

The examples of the present disclosure may be applied for communication between UEs and the communication between UEs may be used for V2X communication. V2X may include, for example, vehicle-to-vehicle (V2V), which may refer to long term evolution (LTE)-based communication between vehicles, vehicle-to-pedestrian (V2P), which may refer to LTE-based communication between a vehicle and a user equipment (UE) carried by a user, and vehicle-to-infrastructure/network (V2I/N), which may refer to LTE-based communication between a vehicle and a roadside unit (RSU)/network. The RSU may be a transportation infrastructure entity configured by a base station or a fixed terminal, such as, an entity that transmits a speed notification to a vehicle.

In terms related to V2X, D2D may refer to communication between UEs. Also, ProSe may represent a proximity service for a UE that performs D2D communication. Also, sidelink control information (SCI) may represent control information associated with the aforementioned sidelink. Also, a Physical Sidelink Shared Channel (PSSCH) may be a channel used to transmit data through a sidelink and a Physical Sidelink Control Channel (PSCCH) may be a channel used to transmit control information through a sidelink. Also, a Physical Sidelink Broadcast Channel (PSBCH) may be a channel used to broadcast a signal through a sidelink and may be used to transfer system information.

In the example related to V2X, the UE may include a vehicle. For example, the UE may refer to a device capable of performing sidelink communication and/or communication with a base station.

This disclosure includes examples applicable to V2X communication, but is not limited to the scope of this disclosure applicable only to V2X. That is, examples of the present disclosure may be applied to various device-to-device communications such as D2D or ProSe communication via PC5 links or side links.

FIG. 1 illustrates an example of a wireless communication system to which the present disclosure may apply.

The network structure illustrated in FIG. 1 may be the network structure of NG-RAN (Next Generation Radio Access Network) or Evolved-Universal Mobile Telecommunications System (E-UMTS). NG-RAN or E-UMTS may include the Long Term Evolution (LTE) system, the LTE-A system, or the like, or may include the 5G mobile communication network, new radio (NR), or the like.

Referring to FIG. 1, in a wireless communication system 10, a base station (BS) 11 and a user equipment (UE) 12 may wirelessly perform transmission and reception of data. Also, the wireless communication system 10 may support device-to-device (D2D) communication between UEs. The following may include all of the concept of a terminal device used by a general user and a terminal device mounted to a vehicle, such as, for example, a smartphone for the aforementioned UE. D2D communication in a wireless communication system will be described later.

The BS 11 in the wireless communication system 10 may provide a communication service to a UE placed in the coverage of the BS 11 via a predetermined frequency band. The coverage within which a BS provides a service is also referred to as a site. The site may include various areas 15a, 15b, and 15c, which may be referred to as sectors. The sectors included in the site may be identified by different identifiers. Each sector 15a, 15b, and 15c may be construed as a part of the area that the BS 11 covers.

The BS 11 may generally refer to a station that communicates with the UE 12, and may be referred to as an evolved-NodeB (eNodeB), gNodeB, ng-eNB, a base transceiver system (BTS), an access point, a femtoeNodeB, a home eNodeB (HeNodeB), a relay, a remote radio head (RRH), DU(Distributed Unit) or the like.

The UE 12 may be a stationary or mobile entity, and may be referred to as a mobile station (MS), a mobile terminal (MT), a user terminal (UT), a subscriber station (SS), a wireless device, a personal digital assistant (PDA), a wireless modem, a handheld device, or the like.

Also, the BS 11 may be referred to as "megacell", "macrocell", "microcell", "picocell", "femtocell", or the like based on the size of coverage provided by the corresponding BS. A cell may be used as a term for indicating a frequency band that a BS provides, the coverage of a BS, or a BS.

Hereinafter, a downlink (DL) indicates communication or a communication path from the BS 11 to the UE 12, and an uplink (UL) indicates communication or a communication path from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

Meanwhile, a multiple access scheme applied to the wireless communication system 10 is not limited to a specific scheme. For example, the wireless communication system may utilize various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, and the like. Uplink transmission and downlink transmission may be performed based on a time division duplex (TDD) scheme that performs transmission at different times, or based on a frequency division duplex (FDD) scheme that performs transmission at different frequencies.

Figure 2:
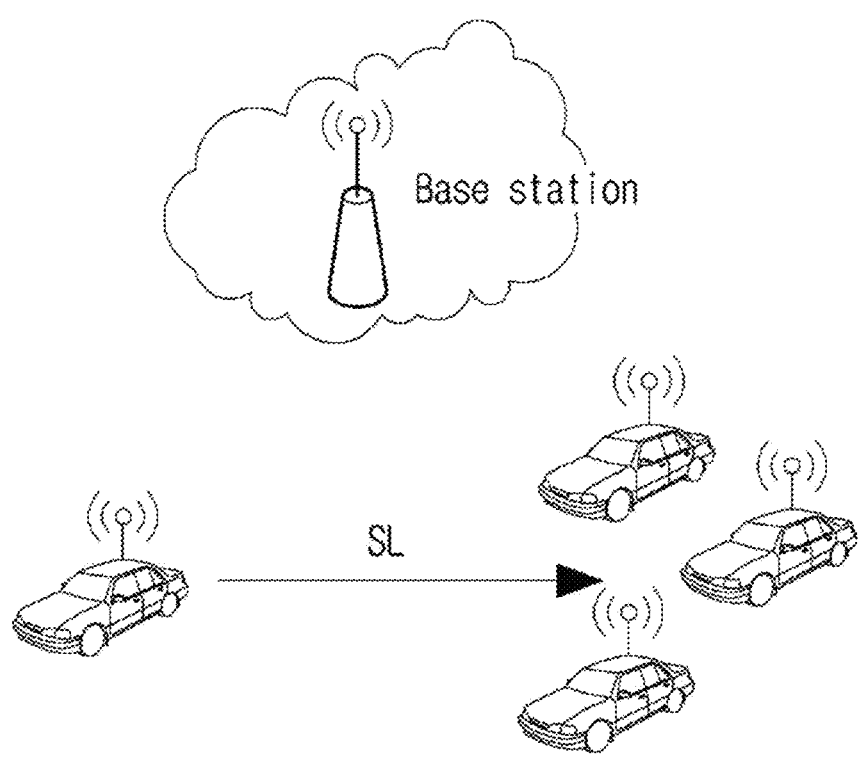
FIG. 2 illustrates an example of a link considered for vehicle-to-everything (V2X) communication to which the present disclosure may apply.

FIG. 2 illustrates an example of a link considered for vehicle-to-everything (V2X) communication to which the present disclosure may apply.

In a communication system supporting V2X, a downlink (DL), an uplink (UL), and a sidelink (SL) communications may be possible.

Referring to FIG. 2, a communication system supporting V2X may support a PC5 link that is a link between UEs, which is defined in device-to-device (D2D) proximity-based service (ProSe)). The PC5 link refers to an interface defined between UEs and may be defined as a sidelink (SL) in a wireless access layer. The sidelink refers to a link in a wireless access layer for direct communication between vehicles for vehicle communication; however, it is not limited thereto.

Figure 3:
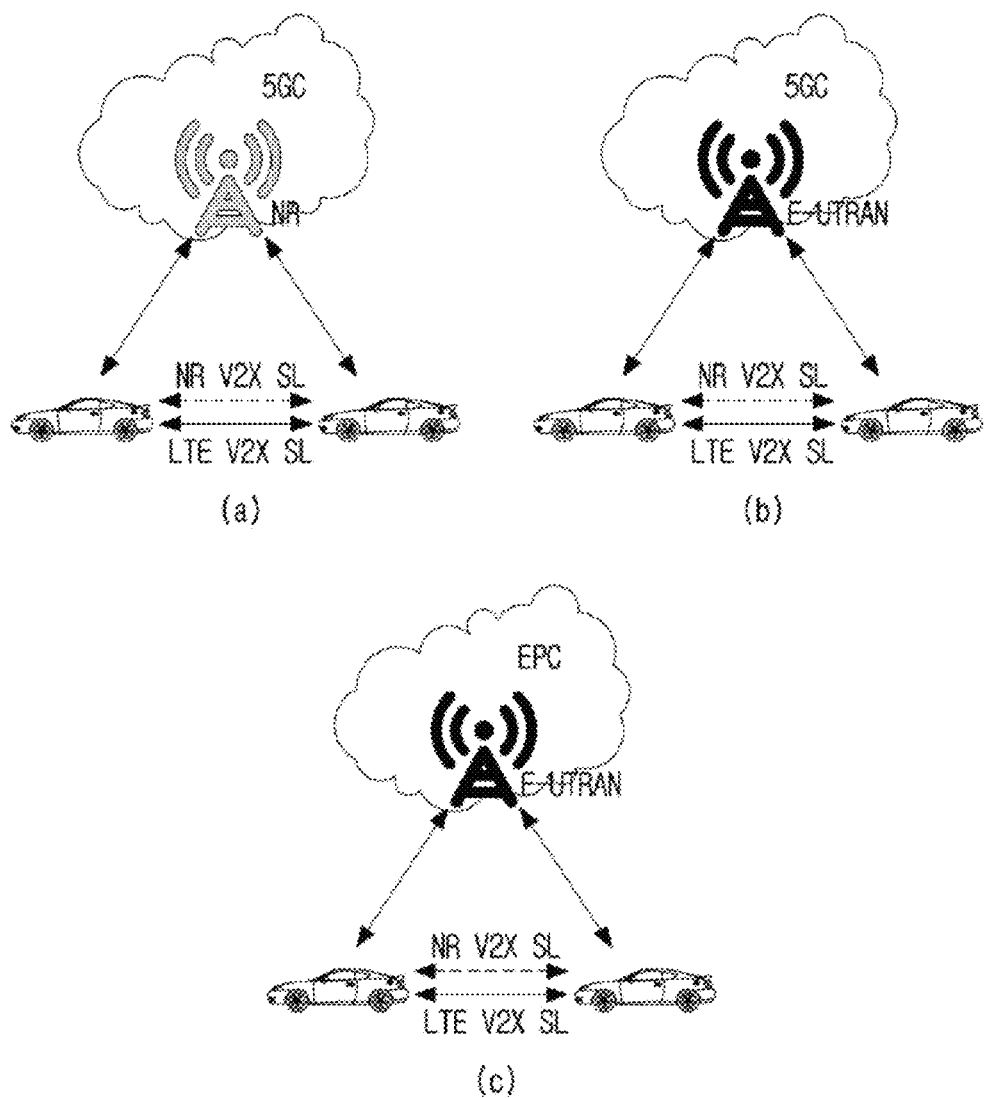
FIG. 3 illustrates an example of a standalone scenario that supports 5G V2X using new radio (NR) sidelink communication to which the present disclosure may apply.

FIG. 3 illustrates an example of a standalone scenario that supports 5G V2X using new radio (NR) sidelink communication to which the present disclosure may apply.

A 5G V2X scenario in which a UE uses NR sidelink communication may be classified as follows.

Referring to FIG. 3(a), gNB may provide control and configuration of LTE SL and NR SL for V2X communication of the UE.

Referring to FIG. 3(b), ng-eNB may provide control and configuration of LTE SL and NR SL for V2X communication of the UE.

Referring to FIG. 3(c), eNB may provide control and configuration of LTE SL and NR SL for V2X communication of the UE.

Figure 4:
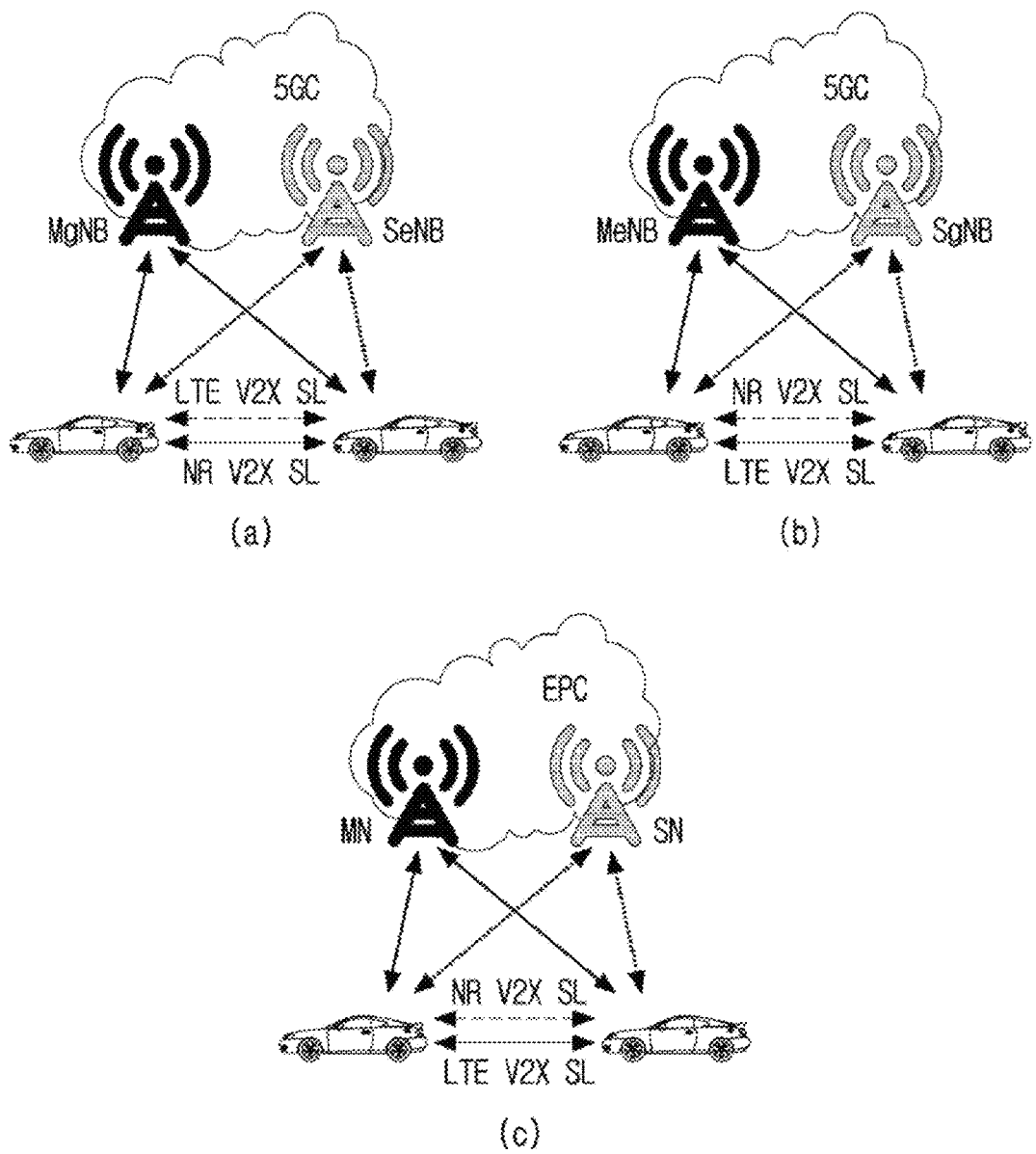
FIG. 4 illustrates an example of a Multi-RAT Dual Connectivity (MR-DC) scenario that supports 5G V2X using NR sidelink communication to which the present disclosure may apply.

FIG. 4 illustrates an example of a Multi-RAT Dual Connectivity (MR-DC) scenario that supports 5G V2X using NR sidelink communication to which the present disclosure may apply.

Referring to FIG. 4(a), while the UE is configured with NR-E-UTRA Dual Connectivity (NE-DC), LTE SL and NR SL may be controlled or configured by Uu. The NE-DC may represent a scenario in which the UE is connected to one gNB operating as a master node (MN) and one ng-eNB operating as a secondary node (SN) in a dual connectivity (DC) structure. Here, all of the MN and the SN may be connected to a 5G core network (5GC).

Referring to FIG. 4(b), while the UE is configured with NG-RAN-E-UTRA NR Dual Connectivity (NGEN-DC), LTE SL and NR SL may be controlled or configured by Uu. The NGEN-DC may represent a scenario in which one UE is connected to one ng-eNB operating as an MN and one gNB operating as an SN in the DC structure. Here, all of the MN and the SN may be connected to the 5GC.

Referring to FIG. 4(c), while the UE is configured with E-UTRA-NR Dual Connectivity (EN-DC), LTE SL and NR SL may be controlled or configured by Uu. The EN-DC may represent a scenario in which the UE is connected to one ng-eNB operating as an MN and one gNB operating as an NS in the DC structure. Here, all of the MN and the SN may be connected to an evolved packet core (EPC).

As described above, the UE may use LTE RAT or NR RAT for sidelink transmission. This may be determined according to a service type and RAT selection may be performed in a V2X application layer. For example, the given service type may be related to 1) LTE RAT only, 2) NR RAT only, 3) LTE or NR RAT, or 4) LTE and NR RAT. Here, since the following unicast and groupcast are transmission types newly introduced in NR V2X communication and the transmission mode is supported in NR RAT only, the RAT selection may apply only to broadcast.

Figure 5:
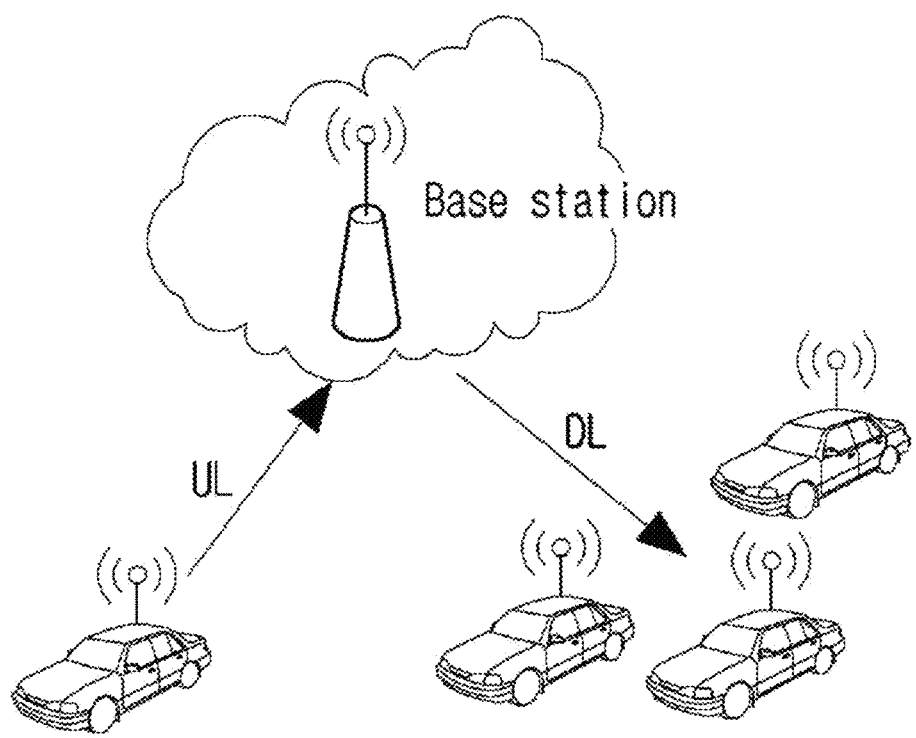
FIG. 5 illustrates an example of a V2X operation scenario using communication with a UE and a base station to which the present disclosure may apply.

FIG. 5 illustrates an example of a V2X operation scenario using communication with a UE and a base station to which the present disclosure may apply.

Referring to FIG. 5, a communication system that supports V2X may also support only a Uu link that is a link between a base station and a UE or between a wireless connection network and the UE. The Uu link may include an upper link (UL) that is a path through which the UE transmits a signal to the base station and a downlink (DL) that is a path through which the base station transmits a signal to the UE.

The UE may use a PC5 interface and/or a Uu interface in performing V2X communication. An interface selection may be performed in a V2X application layer, which may be determined based on Uu/PC5 interface availability information. In particular, with respect to a Uu interface, whether the Uu interface is available may be determined depending on whether the UE is positioned in network coverage (base station coverage (in-coverage (IC)) or positioned out of network coverage (out-of-coverage (OOC)).

As described above, V2X communication may be performed through the base station and may be performed through direct communication between UEs. Here, when the V2X communication is performed through the base station, transmission and/or reception may be performed through the Uu link that is a communication interface between the UE and the base station of LTE in LTE-based V2X communication. Also, in the case of using a sidelink as direct communication between UEs, transmission and/or reception may be performed through a PC5 link that is a communication interface between UEs of LTE in LTE-based V2X communication.

Figure 6:
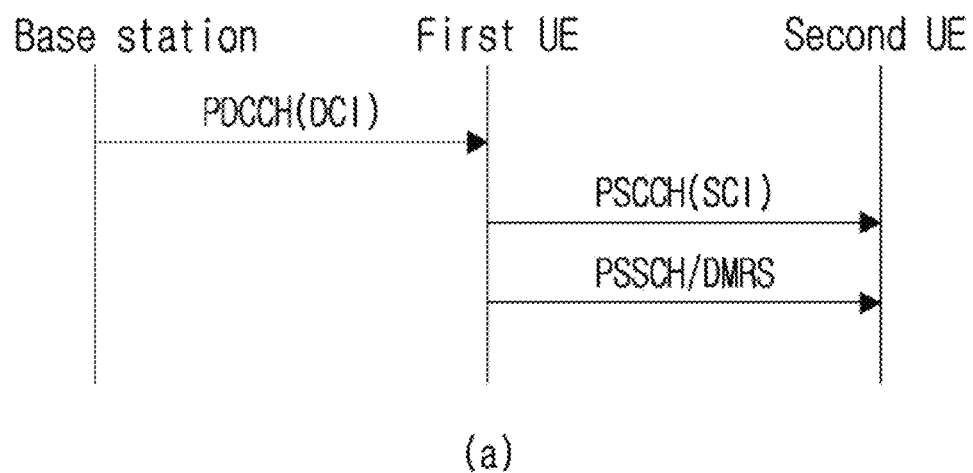
FIG. 6 illustrates an example of a V2X resource allocation method to which the present disclosure may apply.
Figure 6:
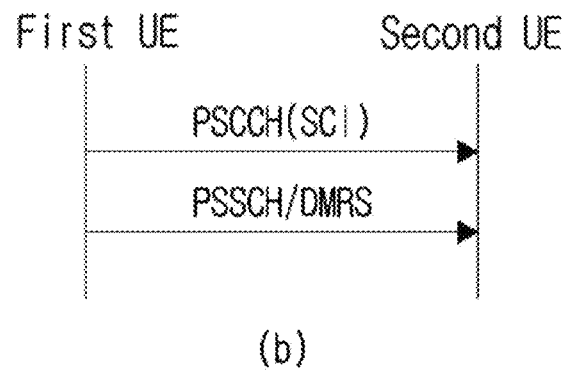

FIG. 6 illustrates an example of a V2X resource allocation method to which the present disclosure may apply.

An operation mode of a V2X UE may be defined according to a resource allocation method.

Similar to an LTE V2X system, an NR V2X system may include a network scheduling mode in which a resource configuration and scheduling is performed by a base station and a non-network scheduling mode that is a mode in which a Tx UE autonomously determines a final resource without network scheduling.

The network scheduling mode may be a mode in which the base station schedules a sidelink physical resource for NR V2X sidelink communication. Here, the base station represents a 3GPP NG-RAN and may be gNB or ng-eNB. The base station may directly perform data transmission scheduling for the sidelink physical resource for the Tx UE using a physical downlink control channel (PDCCH) (e.g., a downlink control information (DCI) format for NR V2X SL), in order to directly control NR V2X sidelink communication within the corresponding base station coverage in response to a sidelink resource allocation request received from each UE.

The non-network scheduling mode may be a mode in which the UE directly (or autonomously) selects and uses a sidelink physical resource within preconfigured resources or resources configured by the base station without scheduling by the base station.

In the following description, the network scheduling mode of the resource allocation method in V2X communication may be mode 1 and the non-network scheduling mode thereof may be mode 2.

FIG. 6(a) illustrates an example of mode 1 and FIG. 6(b) illustrates an example of mode 2.

Referring to FIG. 6(a), the base station may provide scheduling information on a resource to be used for sidelink data transmission to an SL Tx UE (i.e., a first UE) through PDCCH downlink control information (DCI). Therefore, the first UE may provide scheduling information on a resource to be used for sidelink data transmission through PSCCH sidelink control information (SCI) to an SL Rx UE (i.e., a second UE). Then, the first UE may provide PSSCH sidelink data to the second UE on a resource designated through the scheduling information. The second UE may receive PSSCH sidelink data based on PSSCH scheduling information provided through PSCCH SCI. A reference signal (DMRS) for PSSCH demodulation may be transmitted with PSSCH transmission.

Referring to FIG. 6(b), the first UE may autonomously select a resource for transmitting control information and data on a sidelink. The first UE may select a resource from a preconfigured resource pool (i.e., a set of resource candidates) using a method, such as sensing. Through this, the first UE may transmit control information and data to the second UE. For example, the first UE may transmit PSCCH SCI to the second UE in the resource selected by the first UE. The SCI may include PSSCH scheduling information (i.e., information indicating a sidelink data transmission resource selected by the first UE) that the first UE desires to transmit to the second UE. Then, the first UE may transmit PSSCH sidelink data to the second UE in a resource designated through the scheduling information. The second UE may receive PSSCH sidelink data based on PSSCH scheduling information provided through PSCCH SCI. A reference signal (DMRS) for PSSCH demodulation may be transmitted with PSSCH transmission.

Information indicating the aforementioned resource pool may be provided in advance from the base station to the first UE and/or the second UE through broadcast or upper layer (e.g., radio resource control (RRC) layer) signaling.

Mode 2 may be subdivided and defined as follows.

Mode 2-1 corresponds to a mode in which a UE autonomously selects a sidelink physical resource. In this case, the UE may perform sidelink communication by autonomously sensing a necessary resource and directly determining the resource.

Mode 2-2 corresponds to a mode in which the UE may assist other UEs to select sidelink physical resources. In this case, a single representative UE may provide a guide or information required to schedule resources for sidelink communication of other UEs and may assist resource selection of other Tx UEs.

Mode 2-3 corresponds to a mode in which the UE uses a preconfigured sidelink physical resource. In this case, the UE may perform sidelink transmission on the preconfigured sidelink physical resource without performing a separate resource selection operation.

Mode 2-4 corresponds to a mode in which the UE schedules sidelink physical resources of other UEs. In particular, a specific UE may perform scheduling on a sidelink physical resource of another UE, which is similar to the base station in mode 1.

The aforementioned V2X network scheduling mode (mode 1) may correspond to mode 3 in direct link communication and the V2X non-network scheduling mode (mode 2) may correspond to mode 4 in direct link communication. However, it is provided as an example only and the scope of the present disclosure is not limited to a title of the corresponding mode.

In the following examples, although mode 1, mode 2, or mode 2-1, 2-2, 2-3, 2-4 is described for clarity of description, the scope of the present disclosure is not limited to a V2X scheduling mode. The following examples may equally apply even to D2D communication for augmented reality (AR) and virtual reality (VR), D2D communication for emergency communication, and communication for other services based on a sidelink, such as ProSe D2D communication.

Also, the V2X UE may transmit or receive data regardless of an RRC state (e.g., RRC CONNECTED, RRC IDLE, RRC INACTIVE state, etc.) of the UE. Also, when the V2X UE is present in network coverage (IC) or out of the network coverage (OOC), the V2X UE may transmit or receive data. For example, D2D communication may be performed between an IC UE and an IC UE, between an OOC UE and an OOC UE, and between an IC UE and an OOC UE.

When the UE is in NG-RAN coverage, NR sidelink communication and/or V2X sidelink communication may be configured or controlled through dedicated signaling or system information by NG-RAN.

For example, the UE in the RRC CONNECTED state may require a sidelink resource by transmitting sidelink UE Information to a serving cell. As an additional example, the UE in the RRC CONNECTED state may transmit QoS information (e.g., QoS flow or QoS profile) to the serving cell and may receive Sidelink Radio Bearer (SLRB) configuration information from the base station. As an additional example, the UE in the RRC CONNECTED state may transmit UE assistance Information representing a traffic pattern to the serving cell and may receive information on at least one preconfigured resource from the base station. As an additional example, the UE in the RRC CONNECTED state may report a channel busy ratio (CBR) measurement value, location information, and the like, to the base station for sidelink resource allocation.

For example, when the UE is in an RRC IDLE state or in an RRC INACTIVE state, the base station may provide SLRB configuration information through system information.

For example, SLRB configuration information may be preconfigured for the UE out of NG-RAN coverage.

For example, the UE may perform sidelink transmission and reception based on an exceptional pool of a target cell when performing a handover.

Figure 7:
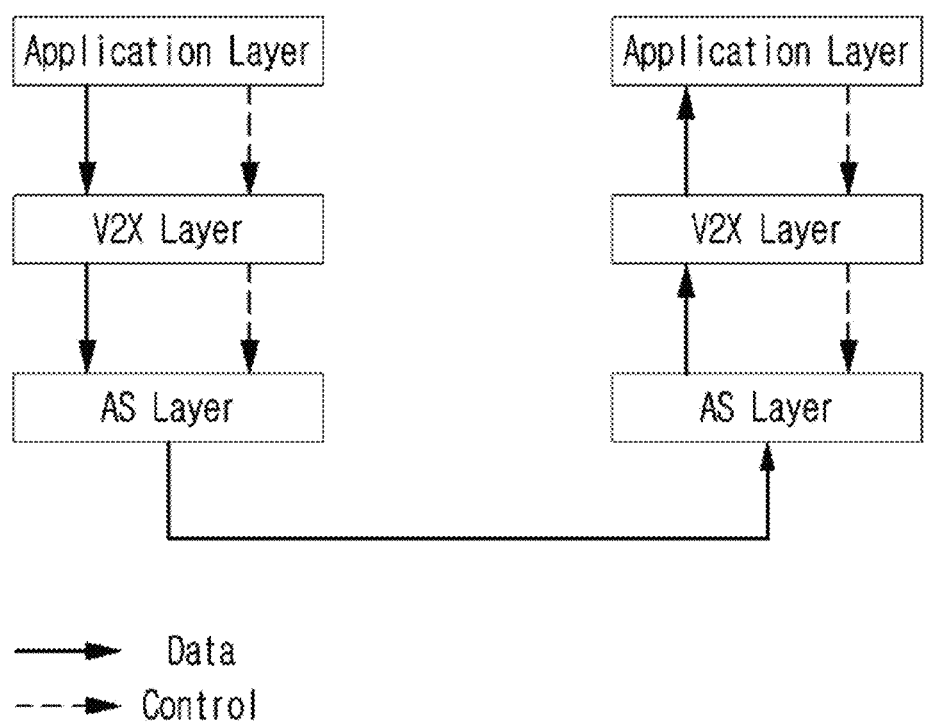
FIG. 7 illustrates an example of a structure of V2X communication to which the present disclosure may apply.

FIG. 7 illustrates an example of a structure of V2X communication to which the present disclosure may apply.

Each V2X UE may include an application layer, a V2X layer, an access stratum (AS) layer.

The application layer of each Tx UE may configure a PC5 QoS parameter for each V2X message and may deliver the same to the V2X layer.

The V2X layer of the Tx UE may verify a V2X service of a packet based on an upper layer parameter and may determine at least one transmission (Tx) profile corresponding thereto. Here, the upper layer parameter may include a service ID and/or QoS parameter, such as a provider service identifier (PSID) or an intelligent transport system-application identifier (ITS-AID). The V2X layer may deliver a packet to LTE and/or NR PC5 AS layer according to the determined at least one Tx profile.

The AS layer of the Tx UE may verify QoS information of the delivered packet and may map the packet to an SLRB corresponding thereto. The AS layer may deliver the packet through a protocol stack (i.e., a Packet Data Convergence Protocol (PDCP), Radio Link Control (RLC), Medium Access Control (MAC), and PHY layers) and preparation in which the corresponding packet is transmitted and transmission may be performed accordingly.

In the Rx UE, the packet received through the AS layer may be delivered to the V2X layer and the application layer.

A detailed configuration of the AS layer is described with reference to FIG. 8.

Figure 8:
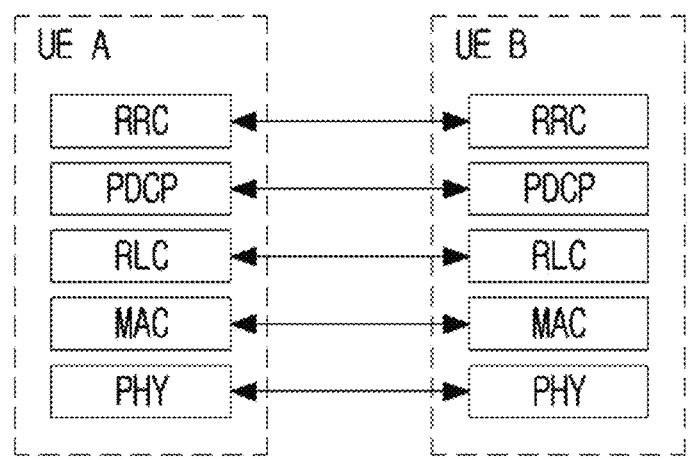
FIG. 8 illustrates an example of a protocol stack of a PC5 interface to which the present disclosure may apply.
Figure 8:
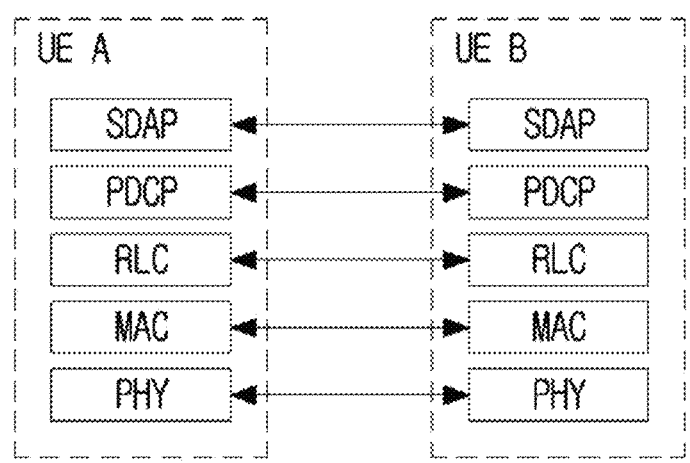

FIG. 8 illustrates an example of a protocol stack of a PC5 interface to which the present disclosure may apply.

Referring to FIG. 8(a), an AS protocol stack for a PC5 interface control plane (PC5-C) of a UE may include RRC, PDCP, RLC, MAC, and PHY layers. Referring to FIG. 8(b), the AS protocol stack for a PC5 interface user plane (PC5-U) of the UE may include Service Data Adaptation Protocol (SDAP), PDCP, RLC, MAC, and PHY layers.

The MAC layer may perform wireless resource selection, packet filtering, priority processing between an upper link and a sidelink, sidelink hybrid automatic repeat request (HARM) transmission, sidelink Link Control Protocol (LCP), sidelink Scheduling Request (SR), sidelink Buffer Status Report (BSR), and the like. Also, the MAC layer may perform LCP based on a sidelink logical channel. The sidelink logical channel may use two channels, a Sidelink Control Channel (SCCH) through which control information is transmitted and a Sidelink Traffic Channel (STCH) through which user information is transmitted. The logical channel may be mapped to a Sidelink-Shared Channel (SL-SCH) transmission channel.

The RLC layer may perform a function of dividing and reassembling an RLC Service Data Unit (SDU) and a function of discarding the RLC SDU. Also, the RLC layer may support an RLC Unacknowledged Mode (UM) or an RLC Acknowledged Mode (AM). A UM or an AM may be used for the unicast transmission and the UM may be used for groupcast or broadcast transmission.

The PDCP layer may perform a timer-based SDU discarding function.

The SDAP layer may perform mapping between the QoS flow and the SLRB.

The RRC layer may transmit a PC5-RRC message between UEs through the PC5 interface. In detail, the UE may exchange UE capability information and AS layer configuration information through the PC5-RRC message. The information may be stored as UE context and the UE may use the stored sidelink UE context for an expected service under PC5-RRC connection.

Figure 9:
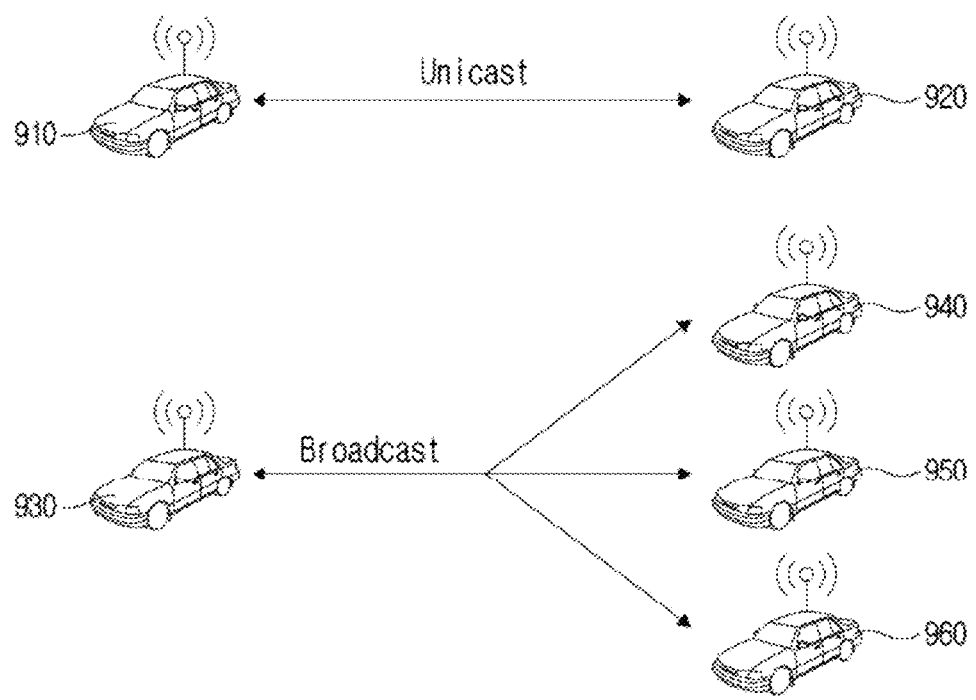
FIGS. 9 and 10 illustrate examples of a sidelink transmission method.
Figure 10:
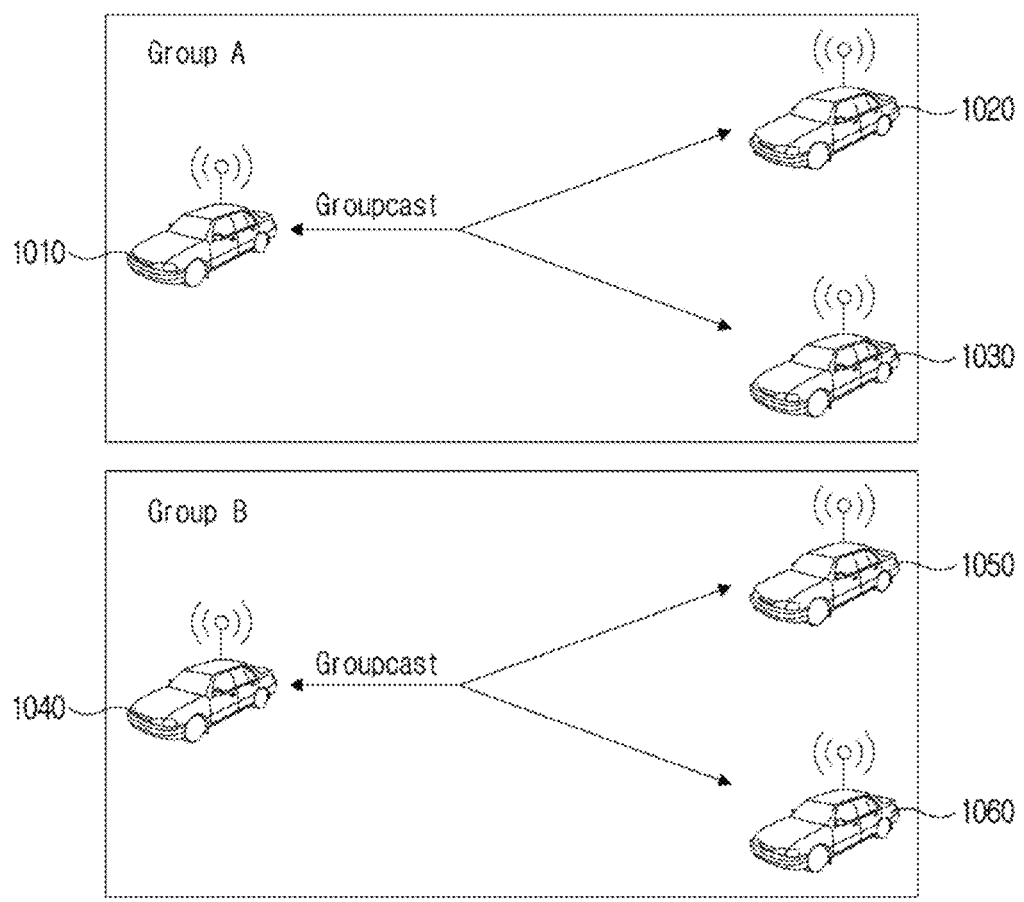

FIGS. 9 and 10 illustrate examples of a sidelink transmission method.

Referring to FIG. 9, unicast transmission may refer to a method in which a single UE 910 transmits a message to another single UE 920. That is, the unicast transmission may represent one-to-one transmission.

Broadcast transmission may refer to a method of transmitting a message to all UEs regardless of whether an Rx UE supports a service. In FIG. 9, a single UE 930 may transmit a message regardless whether a plurality of Rx UEs 940, 950, and 960 supports a service.

Referring to FIG. 10, a groupcast transmission method may be a method of transmitting a message to a plurality of UEs that belongs to a group. For example, a UE 1010 included in a group A may transmit a message to Rx UEs 1020 and 1030 included in the group A through a groupcast method. Here, since the message transmitted from the UE 1010 is not transmitted to Rx UEs included in a group B. In this aspect, the group cast method and the broadcast cast method may be distinguished from each other. Meanwhile, the UE 1040 included in the group B may transmit a message to Rx UEs 1050 and 1060 included in the group B through the groupcast method.

The unicast and groupcast transmission methods may be applied for a new V2X service. For example, to support the new V2X service, low latency and high reliability may be required and when sharing information based on the broadcast, it may be difficult to meet such requirements. Therefore, in the NR V2X, there is a need to support unicast and/or groupcast that are new two-way transmission mechanisms to process high-speed data transmission between vehicles in addition to the broadcast method.

Table 1 represents examples of unicast that includes the new V2X service.

TABLE 1

| Use case group | Section number | Use case name |
| --- | --- | --- |
| Platooning | 5.1 | eV2X support for Vehicle Platooning |
| | 5.2 | Information exchange within platoon |
| | 5.5 | Automated Cooperative Driving for Short distance Grouping |
| | 5.12 | Information sharing for limited automated platooning |
| | 5.13 | Information sharing for full automated platooning |
| | 5.17 | Changing Driving-Mode |
| Advanced Driving | 5.9 | Cooperative Collision Avoidance (CoCA) |
| | 5.10 | Information sharing for limited automated driving |
| | 5.11 | Information sharing for full automated driving |
| | 5.20 | Emergency Trajectory Alignment |
| | 5.22 | Intersection Safety Information Provisioning for Urban Driving |
| | 5.23 | Cooperative lane change (CLC) of automated vehicles |
| | 5.25 | 3D video composition for V2X scenario |

TABLE 1-continued

| Use case group | Section number | Use case name |
| --- | --- | --- |
| Remote driving | 5.4 | eV2X support for Remote Driving |
| | 5.21 | Teleoperated Support (TeSo) |
| Extended Sensor | 5.3 | Automotive: Senor and State Map Sharing |
| | 5.6 | Collective Perception of Environment |
| | 5.16 | Video data sharing for automated Driving |
| General | 5.7 | Communication between vehicles of different 3GPP RATs |
| | 5.8 | Multi-PLMN environment |
| | 5.15 | Use case on Multi-RAT |
| | 5.19 | Use case out of 5G coverage |
| | 5.14 | Dynamic Ride Sharing |
| | 5.18 | Tethering via Vehicle |
| | 5.24 | Proposal for secure software update for electronic control unit |
| Vehicle quality of service support | 5.26 | QoS aspect of vehicles platooning |
| | 5.27 | QoS aspects of advanced driving |
| | 5.28 | QoS aspects of remote driving |
| | 5.29 | QoS Aspect for extended sensor |
| | 5.30 | Different QoS estimation for different V2X applications |

Similar to the aforementioned V2X service, new unicast for an interactive service and a large-capacity short-distance multimedia service, such as augmented reality (AR) and virtual reality (VR), may be applied. Therefore, there is a need to consider a variety of QoS information on the large-capacity short-distance multimedia service as well as the aforementioned new V2X service. That is, to support QoS requirements for various services in D2D communication, a QoS management operation in D2D communication needs to be newly defined.

Hereinafter, a QoS management operation in D2D communication is described.

QoS management may be involved with V2X communication in terms of resource allocation, congestion control, in-device coexistence, power control, and SLRB configuration. In the case of sidelink unicast, groupcast, and broadcast, QoS parameters of a V2X packet may be provided to an AS through an upper layer and such QoS parameters may include requirements, such as traffic priority, standby time, reliability, minimum required communication range, and a data rate. The SLRB may be configured in a UE according to QoS information.

Figure 11:
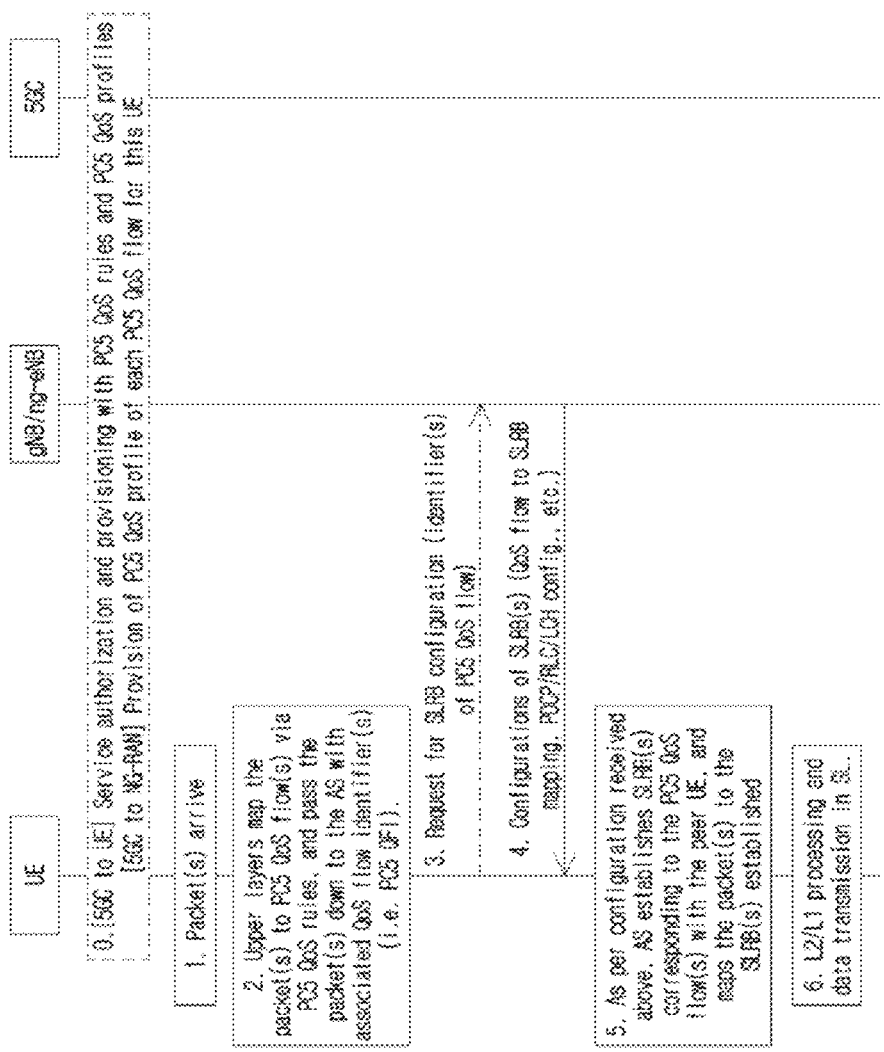
FIGS. 11 to 13 illustrate examples of a sidelink radio bearer (SLRB) configuration method to which the present disclosure may apply.
Figure 12:
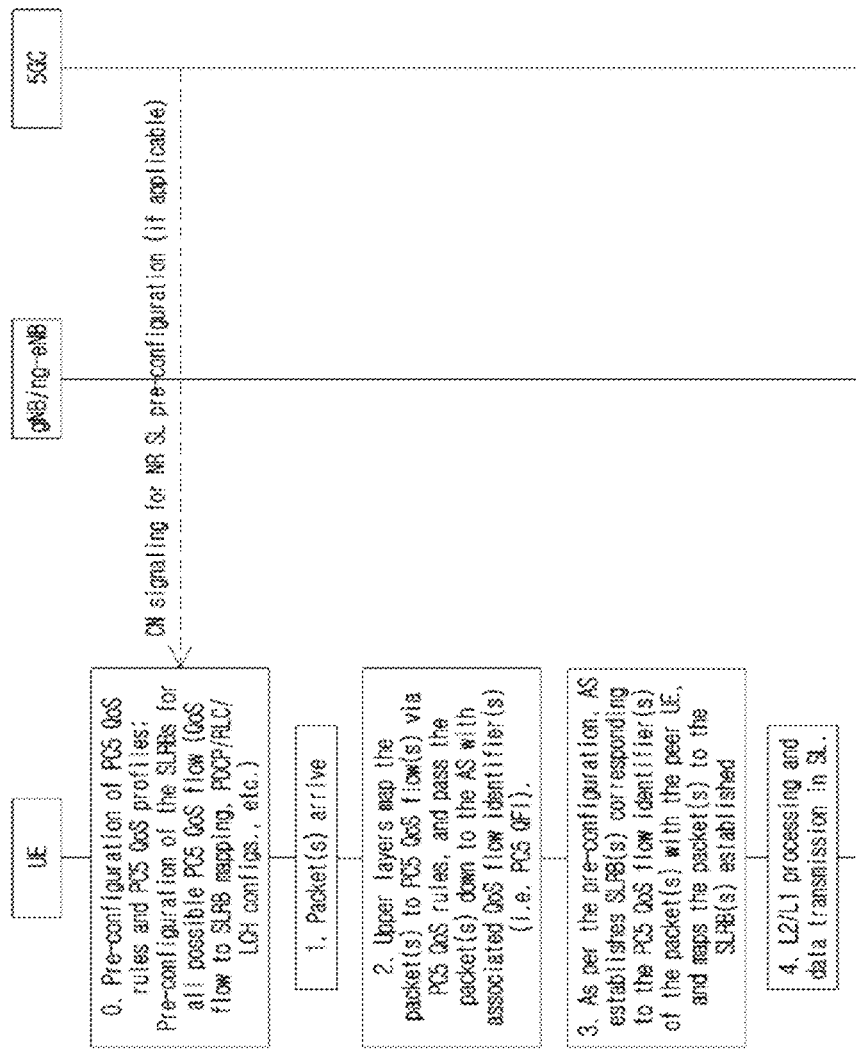
Figure 13:
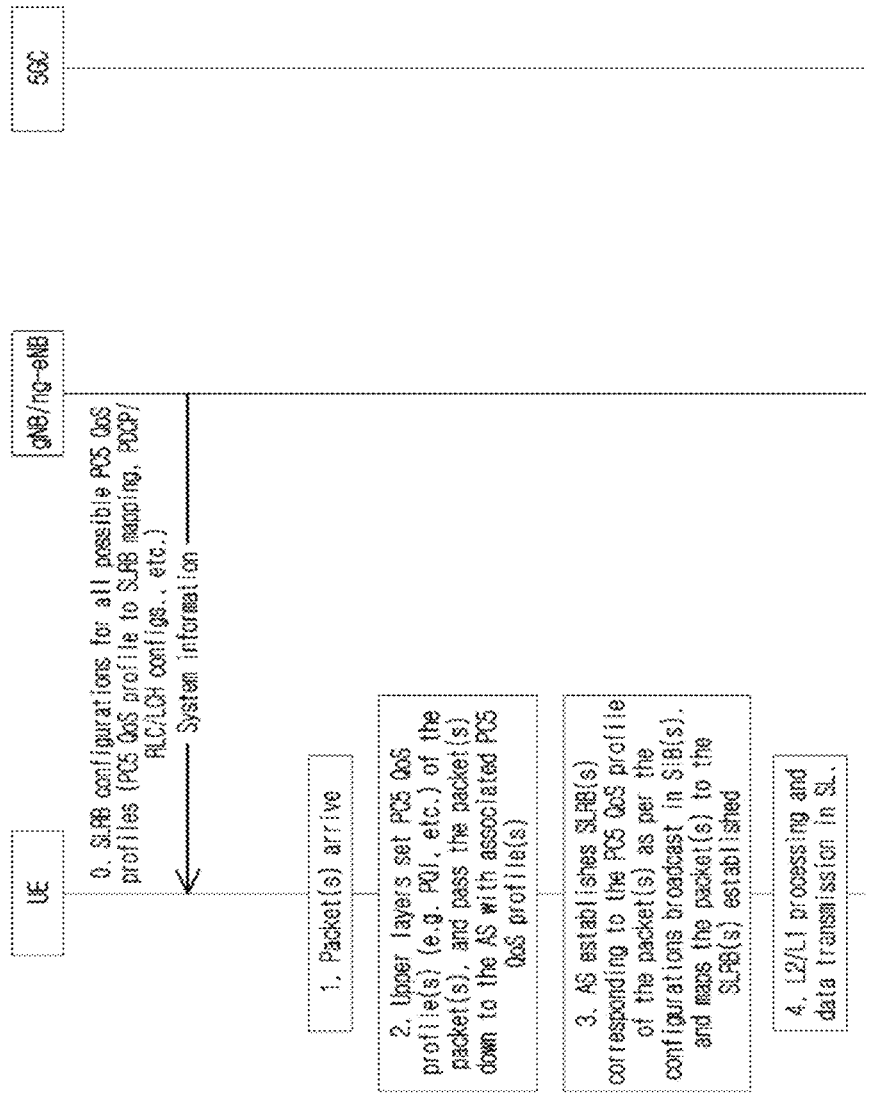

FIGS. 11 to 13 illustrate examples of a SLRB configuration method to which the present disclosure may apply.

FIG. 11 illustrates an example in which an SLRB is configured in a UE in an RRC CONNECTED state.

When the UE is in NG-RAN coverage, NR sidelink communication and/or V2X sidelink communication may be configured and controlled by NG-RAN through dedicated signaling or system information.

In operation 0, a PC5 QoS profile (e.g., a specific PC5 QoS parameter set and PC5 QoS rule of each PC5 QoS flow) may be provided to a UE through a service authorization and a provisioning procedure. Also, similar thereto, a PC5 QoS profile of each QoS profile may be provided in advance to the UE by a base station (e.g., gNB/ng-eNB).

When a packet is delivered to an AS layer of the UE in operation 1, the UE may derive an identifier (i.e., PC5 QFI (QoS Flow Identifier)(s) of associated PC5 QoS flow(s) based on the PC5 QoS rule configured in operation 0 in operation 2. In operation 3, the UE may transmit the PC5 QFI derived in operation 2 to the base station.

The base station may derive the reported QoS profile of PC5 QFI based on provisioning from 5GC in operation 0. In operation 4, the base station may transmit SLRB configuration information related to the PC5 QFI to the UE through RRC dedicated signaling. The SLRB configuration information may include a PC5 QoS flow for SLRB mapping, SDAP/PDCP/RLC/LCH configuration, and the like.

In operation 5, the AS layer of the UE may establish SLRB(s) corresponding to PC5 QFI(s) of the packet according to the configuration provided from the base station and may map the available packet to the established SLRB(s). In operation 6, the UE may perform sidelink unicast, groupcast, or broadcast transmission.

FIG. 12 illustrates an example in which an SLRB is established in a UE out of network coverage.

In operation 0, PC5 QoS rules and SLRB configuration information on each PC5 QoS flow may be preconfigured. In operation 1 to operation 3, when a packet is delivered to an AS layer of a UE, the UE may derive a PC5 QoS flow identifier of the packet, establish SLRB(s) associated with PC5 QFI(s) of the packet according to pre-configuration information, and may map the available packet to the established SLRB(s). In operation 4, the UE may perform sidelink unicast, groupcast, or broadcast transmission.

As an additional example related to FIG. 11 or FIG. 12, the UE may self-assign a PC5 QoS flow identifier of PC5 QoS. In this case, the base station may be unaware of a corresponding PC5 QoS profile only with a PC5 QoS flow identifier reported by the UE. Therefore, the base station may establish the SLRB based on the PC5 QoS profile. The SLRB configuration information may be transmitted to the UE through RRC dedicated signaling and may include SDAP/PDCP/RLC/LCH configuration information and SLRB mapping information according to the QoS profiles. The AS layer of the UE may establish SLRB(s) corresponding to QoS profiles of the packet according to configuration provided from the base station and may map an available packet to the configured SLRB(s). Then, the UE may perform sidelink unicast, groupcast, or broadcast transmission.

FIG. 13 illustrates an example in which an SLRB is configured in a UE in an RRC IDLE state or in an RRC INACTIVE state.

In operation 0, a base station may broadcast SLRB configuration related to each available PC5 QoS profile using a V2X specific system information block (SIB). In operations 1 and 2, the UE may verify SLRB configuration information through an SIB, may establish SLRB(s) corresponding to a QoS profile of an available packet, and may map the corresponding packet to the established SLRB(s). In operation 4, the UE may perform sidelink unicast, groupcast, or broadcast transmission.

Hereinafter, a detailed operation of a resource allocation mode in D2D communication is described. In the following description, mode 1 corresponds to a network scheduling mode and mode 2 corresponds to a non-network scheduling mode (or a UE autonomous resource allocation mode).

For a UE that operates in mode 1, a resource allocation method that the base station may apply to a corresponding UE for D2D communication may include a dynamic resource allocation method and a configured grant method. Here, the configured grant method may include a grant-free (GF) method and a semi-persistent scheduling (SPS) method, which may be referred to as configured grant type 1 and configured grant type 2, respectively.

In the dynamic resource allocation method, the base station may allocate a resource necessary for D2D communication to a first UE through predetermined DCI.

Here, the first UE may determine sidelink control information (SCI) based on DCI and may generate the determined sidelink control information as first SCI and second SCI. The first UE may transmit the first SCI to the second UE through a PSCCH and may transmit the second SCI to the second UE using a portion of PSSCH transmittable resources.

The second UE may identify a sidelink resource used for the first UE to transmit the PSSCH based on the first SCI and the second SCI received from the first UE. The second UE may receive sidelink data from the first UE through the PSSCH on the identified resource.

The aforementioned DCI is one-time. Therefore, when the first UE desires to implement new data transmission for the second UE, the first UE needs to receive additional resource allocation information from the base station through the DCI.

In the configured grant method, the resource allocation method is as follows.

In the case of configured grant type 1 (i.e., a GF method), the base station may transmit information (hereinafter, GF transmission resource activation information) indicating activation of corresponding GF transmission resource allocation information to the first UE through RRC signaling, with information on a wireless resource of a sidelink and information (hereinafter, GF transmission resource allocation information) on an iterative allocation such as a period and offset of corresponding wireless resource allocation.

The first UE may determine sidelink control information based on the GF transmission resource allocation information activated by the base station and may generate the determined sidelink control information as the first SCI and the second SCI. The first UE may transmit the first SCI to the second UE through the PSCCH and may transmit the second SCI to the second UE using a portion of PSSCH transmittable resources.

The second UE may identify a sidelink resource used for the first UE to transmit the PSSCH based on the first SCI and the second SCI received from the first UE. The second UE may receive the sidelink data from the first UE through the PSSCH on the identified resource.

The GF transmission resource allocation information received by the first UE from the base station may be validly applied until a message indicating inactivation of a GF transmission resource after activation is received through separate RRC signaling. Therefore, when the first UE desires to implement new data transmission for the second UE while the GF resource allocation information is valid or activated, the first UE may transmit data using a sidelink wireless resource that arrives at a subsequent period according to the GF resource allocation information.

When the first UE performs PSSCH data transmission for the second UE and then receives a HARQ NACK message for the corresponding data from the second UE, retransmission of the corresponding data may be performed. Here, a sidelink resource for retransmission may be newly allocated to the first UE from the base station using the dynamic resource allocation method, instead of using the sidelink resource indicated by the GF transmission resource allocation information.

Next, in the case of configured grant type 2 (i.e., an SPS method), the base station may transmit information on a wireless resource of a sidelink and information (hereinafter, SPS transmission resource allocation information) on an iterative allocation such as a period and offset of corresponding wireless resource allocation.

Then, the base station may transmit information (hereinafter, SPS transmission resource activation information)

indicating activation of the SPS transmission resource allocation information to the first UE through separate signaling, such as DCI and the like.

The first UE may determine sidelink control information based on SPS transmission resource allocation information activated by the base station and may generate the determined sidelink control information as first SCI and second SCI. The first UE may transmit the first SCI to the second UE through a PSCCH and may transmit the second SCI to the second UE using a portion of PSSCH transmittable resources.

The second UE may identify a sidelink resource used for the first UE to transmit the PSSCH based on the first SCI and the second SCI received from the first UE. The second UE may receive the sidelink data from the first UE through the PSSCH on the identified resource.

The SPS transmission resource allocation information received by the first UE from the base station may be validly applied until a message indicating inactivation of an SPS transmission resource after activation is received through separate DCI signaling. Therefore, when the first UE desires to implement new data transmission for the second UE while the SPS resource allocation information is valid or activated, the first UE may transmit data using a sidelink wireless resource that arrives at a subsequent period according to the SPS resource allocation information.

In the configured grant method that includes the aforementioned GF or SPS, when the first UE performs PSSCH data transmission for the second UE and then receives a HARQ NACK message for the corresponding data from the second UE, retransmission of the corresponding data may be performed. Here, a sidelink resource for retransmission may be newly allocated to the first UE from the base station using the dynamic resource allocation method, instead of using the sidelink resource indicated by the GF/SPS transmission resource allocation information.

Next, in mode 2, a UE self-selects a resource for D2D communication and thus, has no need to be assigned with a resource from a base station using a dynamically or configured grant method. In mode 2, a procedure for the first UE to select a resource may be performed. For example, according to a subdivided lower mode of mode 2, the first UE may sense a necessary resource, may assist a resource selection of another UE, may also use a preconfigured resource, and may allocate a resource to the other UE.

Even in the case of mode 2, the first UE may generate scheduling information on the PSSCH to be transmitted on the selected sidelink resource as the first SCI and the second SCI and may transmit the same to the second UE.

Hereinafter, the first SCI and the second SCI transmitted from the first UE to the second UE in the aforementioned various resource allocation methods are described.

The first SCI may also be referred to as 1st stage SCI and may use, for example, SCI format 0-1. The first SCI may correspond to SCI transmitted through the PSCCH.

The first SCI may include information, for example, priority, time and/or frequency resource allocation for the PSSCH, a resource reservation section, a DMRS pattern, a second SCI format, MCS, and the like.

Here, the second SCI format information may indicate format information of the second SCI transmitted through the PSSCH. According to the indicated format information, a size of the second SCI may be differently determined. Therefore, a size of time and/or frequency resources allocated for the second SCI within the PSSCH may be modified. For example, a necessary resource amount may be differently configured according to format information of the second SCI, such as format information that requires resources with two symbols and 10 resource blocks (RBs) or format information that requires three symbols and seven RBs.

Then, the second SCI may also be referred to as 2nd stage SCI and may use, for example, SCI format information 0-2. The second SCI may correspond to SCI transmitted through the PSSCH.

The second SCI may include a HARQ process ID, a new data indicator (NDI), a redundancy version (RV), a source ID, a destination ID, a channel state information (CSI) report request indicator, and the like. Additionally, when the first SCI instructs that the second SCI includes format information corresponding to a specific type groupcast (e.g., a groupcast method in which UEs within a single group all share a HARQ NACK transmission resource and transmits HARQ feedback through the shared resource (or feedback channel) only in the case of NACK and do not transmit the HARQ feedback in the case of ACK), the second SCI may further include a zone ID, communication range requirement information, and the like.

Here, the NDI may have a 1-bit size and may not be toggled in the case of transmission of the same data as previous transmission and may have a toggled value in the case of new data different from the previous transmission.

The RV corresponds to a value for indicating a data area configured according to a transmission data division and a predetermined channel coding method when performing HARQ retransmission.

The source ID refers to an ID of a UE that transmits sidelink data and corresponds to 8 least significant bits (LSBs) in a source L2 ID with a total size of 24 bits.

The destination ID refers to an ID of a UE that receives the sidelink data and corresponds to 16 LSBs in a destination L2 ID with a total size of 24 bits.

The CSI report request indicator has a 1-bit size and represents that CSI report including a rank indicator (RI) and a channel quality indicator (CQI) for a sidelink channel is not requested for 0 and the CSI report is requested for 1.

The zone ID corresponds to an indicator for each of zones divided according to a geographical position.

The communication range requirements generally correspond to a minimum arrival distance for allowing smooth communication in consideration of QoS of a corresponding service.

Hereinafter, a basic operation of discontinuous reception (DRX) and related parameters are described. The following DRX operation may include a DRX operation for a link between a network (or a base station) and a UE and a DRX operation for a link for D2D communication.

Initially, the basic operation of DRX and related parameters are described. A portion of or all of such DRX operations may apply to the D2D communication according to the present disclosure.

A DRX operation may be configured for a MAC entity through RRC signaling. This DRX operation is to control activation of PDCCH monitoring of the MAC entity of a UE. PDCCH monitoring may be defined as monitoring that is limited to a specific PDCCH (e.g., a PDCCH scrambled and thereby transmitted with a Cell-Radio Network Temporary Identifier (C-RNTI), a Configured Scheduling-RNTI (CS-RNTI), an Interruption-RNTI (INT-RNTI), a Slot Format Indication-RNTI (SFI-RNTI), a Semi-Persistent CSI-RNTI (SP-CSI-RNTI), a Transmit Power Control-Physical Uplink Control Channel-RNTI (TPC-PUCCH-RNTI), a TPC-Physical Uplink Shared Channel-RNTI (TPC-PUSCH-RNTI), a Sidelink-RNTI (SL-RNTI), a Sidelink-Configured Scheduling-RNTI (SL-CS-RNTI), or a TPC-Sounding Reference Symbol-RNTI (TPC-SRS-RNTI)). However, although DRX is configured for the UE, the corresponding UE is not limited to performing only the specific PDCCH monitoring operation.

The RRC may control the DRX operation by configuring the following parameters:

drx-onDurationTimer A timer that defines a periodic PDCCH occasion duration from a start point in time of a DRX cycle;

drx-SlotOffset: A delay value for a start point in time of drx-onDurationTimer;

drx-InactivityTimer: A timer that defines a duration after a PDCCH occasion including a PDCCH indicating that a new uplink or downlink transmission is present for a corresponding MAC entity;

drx-RetransmissionTimerDL (operated for each downlink (DL) HARQ process except for a broadcast HARQ process): A timer that defines a maximum duration until downlink retransmission is received;

drx-RetransmissionTimerUL (operated for each uplink (UL) HARQ process): A timer that defines a maximum duration until resource allocation information (grant) for uplink retransmission is received;

drx-RetransmissionTimerSL (operated for each sidelink (SL) HARQ process): A timer that defines a maximum duration until resource allocation information (grant) for sidelink retransmission is received from the base station;

drx-LongCycleStartOffset: A drx-StartOffset value that defines a subframe in which a long DRX cycle and a short DRX cycle start;

drx-ShortCycle (optional): A short DRX cycle;

drx-ShortCycleTimer (optional): A duration in which the UE needs to use the short DRX cycle;

drx-HARQ-RTT-TimerDL (operated for each downlink (DL) HARQ process except for a broadcast HARQ process): A minimum duration before a point in time at which a downlink resource allocation for HARQ retransmission is expected at the MAC entity;

drx-HARQ-RTT-TimerUL (operated for each uplink (UL) HARQ process): A minimum duration before a point in time at which uplink resource allocation for HARQ retransmission is expected at the MAC entity;

drx-HARQ-RTT-TimerSL (operated for each sidelink (SL) HARQ process): A minimum duration before a point in time at which resource allocation for HARQ retransmission for a sidelink from the base station is expected at the MAC entity;

active time: A time in which the MAC entity monitors the PDCCH;

DRX cycle: defined as a duration in which an on-duration is periodically repeated. For example, referring to FIG. 14, an inactive duration may be periodically repeated from end of a corresponding on-duration to an end of the DRX cycle;

PDCCH occasion: defined as a time duration that is represented as a number of one or consecutive orthogonal frequency division multiplex (OFDM) symbols and configured in the MAC entity to monitor the PDCCH.

The aforementioned SL timer-related parameters may be included in DRX configuration information for a wireless link ((e.g., a Uu link) between a base station and a UE. For example, when the corresponding UE receives SL HARQ feedback information and a retransmission operation is configured based thereon, the aforementioned SL timer-related parameters may be included in DRX configuration information for a wireless link (e.g., a Uu link) between the base station and the UE.

A value of other DRX parameter(s) may be used for DRX configuration information to be independently configured according to the Uu interface and the sidelink. Therefore, parameter definition for distinguishing the Uu and the SL may not be required for such DRX parameter(s). Among the DRX parameter(s), DRX parameters defined without being related to the Uu link (e.g., DL/UL) or SL may be applied to the Uu link, may also be applied to the SL, may also be commonly applied to the Uu link and the SL, and may also be independently applied to each of the Uu link and the SL (even for the same parameter name, whether it is for Uu or SL may be distinguished in a parameter configuration process). As described above, a DRX operation and a parameter configuration and a sidelink DRX operation and a parameter configuration between the base station and the UE may be individually applied.

Figure 14:
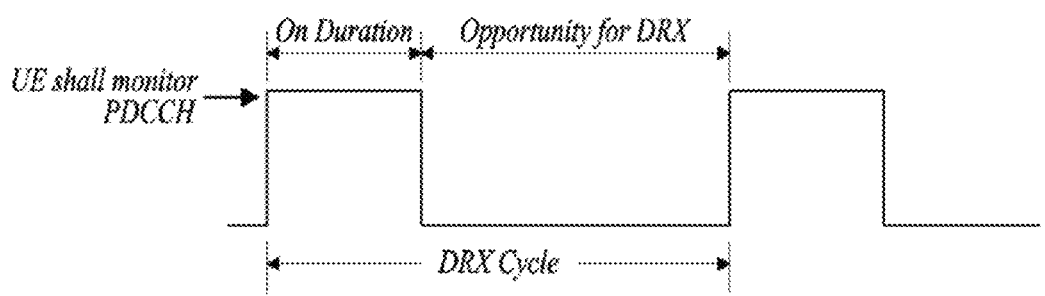
FIG. 14 illustrates an example of a DRX operation to which the present disclosure may apply.

FIG. 14 illustrates an example of a DRX operation to which the present disclosure may apply.

Examples of the following DRX operation are described with the assumption that the DRX operation is applied between a base station and a UE (e.g., a Uu link). For example, the DRX operation between the base station and the UE may be explained in association with an operation of monitoring, by the UE, PDCCH transmission from the base station. However, the following description may be equally applied even to the DRX operation for D2D communication (e.g., sidelink), without being limitedly applied only to the DRX operation between the base station and the UE. For example, the DRX operation for D2D communication may be explained in association with an operation of monitoring, by the second UE, a PSCCH transmission from the first UE. Also, an operation related to a DRX command MAC control element (CE), a long DRX command MAC CE, and a CSI-masking during the DRX operation between the base station and the UE may be equally applied to the DRX operation for D2D communication although the operation is not separately mentioned in the DRX operation for D2D communication.

Referring to FIG. 14, the UE iterates an on-duration and an opportunity for DRX according to a DRX cycle. That is, the DRX cycle may correspond to a cycle for repeating the on-duration. The on-duration refers to a time in which the UE wakes up and performs PDCCH monitoring and the opportunity for DRX refers to a time in which the UE does not attempt reception in a sleep state. For example, if the UE does not receive valid control information from the base station during the on-duration, the UE may sleep by performing the DRX operation.

Hereinafter, the aforementioned DRX operation will be further described with reference to FIG. 14.

When the DRX is configured, an active time includes a case in which the following operations are performed:

When drx-onDurationTimer or drx-InactivityTimer or drx-RetransmissionTimerDL or drx-RetransmissionTimerUL or drx-RetransmissionTimerSL timer is in progress;

When a scheduling request (SR) is transmitted through a PUCCH, or when a transmission is pending.

When the DRX is configured, the MAC entity may operate as follows:

1> if a MAC PDU is received from a resource (GF or SPS) configured in a downlink:

2> start drx-HARQ-RTT-TimerDL related to a HARQ process of the corresponding MAC PDU from a first symbol after the end of a transmission including DL HARQ feedback for the MAC PDU;
2> stop drx-RetransmissionTimerDL related to the HARQ process of the corresponding MAC PDU.
1> if a MAC PDU is transmitted through a resource (GF or SPS) configured in an uplink:
2> start drx-HARQ-RTT-TimerUL related to the HARQ process of the corresponding MAC PDU from the first symbol after the end of a first PUSCH transmission for the MAC PDU;
2> stop drx-RetransmissionTimerUL related to the HARQ process of the corresponding MAC PDU.
1> if any drx-HARQ-RTT-TimerDL expires:
2> if decoding of data of the corresponding HARQ process fails:
3> start drx-RetransmissionTimerDL related to the HARQ process of the corresponding MAC PDU from the first symbol upon expiry of the drx-HARQ-RTT-TimerDL.
1> if any drx-HARQ-RTT-TimerUL expires:
2> start drx-RetransmissionTimerUL related to the HARQ process of the corresponding MAC PDU from the first symbol upon expiry of the drx-HARQ-RTT-TimerUL.
1> if the DRX command MAC CE or if the long DRX command MAC CE is received:
2> stop drx-onDurationTimer;
2> stop drx-InactivityTimer.
1> if drx-InactivityTimer expires or the DRX command MAC CE is received:
2> if the short DRX cycle is configured:
3> start drx-ShortCycleTimer in the first symbol upon expiry of drx-Inactivity Timer or at the end of receiving DRX Command MAC CE, or restart the corresponding if it is in progress;
3> use the short DRX cycle.
2> otherwise:
3> use the long DRX cycle.
1> if drx-ShortCycleTimer expires:
2> use the long DRX cycle.
1> if the long DRX command MAC CE is received:
2> stop drx-ShortCycleTimer;
2> use the long DRX cycle.
1> if the short DRX cycle is applied [(SFN×10)+subframe number] modulo (drx-ShortCycle)=(drx-StartOffset) modulo (drx-ShortCycle); or
1> if the long DRX cycle is applied and [(SFN×10)+ subframe number] modulo (drx-LongCycle)=drx-StartOffset:
2> start drx-onDurationTimer after drx-SlotOffset from a start point of a subframe.
1> if the MAC entity is an active time:
2> monitor the PDCCH;
2> if the PDCCH indicates a DL transmission:
3> start drx-HARQ-RTT-TimerDL related to the HARQ process of the corresponding MAC PDU from the first symbol after the end of a transmission that includes DL HARQ feedback for the MAC PDU;
3> stop drx-RetransmissionTimerDL related to the HARQ process of the corresponding MAC PDU.
2> if the PDCCH indicates a UL transmission:
3> start drx-HARQ-RTT-TimerUL related to the HARQ process of the corresponding MAC PDU from the first symbol after the end of the first PUSCH transmission for the MAC PDU;
3> stop drx-RetransmissionTimerUL related to the HARQ process of the corresponding MAC PDU.
2> if the PDCCH indicates a new DL transmission or a new UL transmission:
3> start drx-Inactivity Timer in the first symbol after the end of reception of the PDCCH or restart if the corresponding timer is in progress.
1> if it is not an active time until a point in time before 4 ms in a current symbol n when, in the current symbol n, the MAC entity considers all conditions related to the active time, such as a resource allocation, a DRX command MAC CE, a long DRX command MAC CE, an SR transmission, and the like:
2> do not perform periodic sounding reference signaling (SRS) and SPS SRS transmission.
1> if CSI-masking is configured by upper layers:
2> if drx-onDurationTimer is not in progress until a point in time before 4 ms in the current symbol n when, in the current symbol n, the MAC entity considers all conditions related to the active time, such as a resource allocation, a DRX Command MAC CE, a long DRX command MAC CE, an SR transmission, and the like:
3> Do not report CSI through the PUCCH.
1> otherwise:
2> if it is not an active time until a point in time before 4 ms in a current symbol n when, in the current symbol n, the MAC entity considers all conditions related to the active time, such as a resource allocation, a DRX command MAC CE, a long DRX command MAC CE, an SR transmission, and the like:
3> do not report CSI through the PUCCH and SPS CSI through the PUSCH.

In the aforementioned DRX operation, the MAC entity may perform HARQ feedback and may perform aperiodic CSI report and aperiodic SRS transmission through the PUSCH, regardless of whether PDCCH monitoring is in progress.

Also, the MAC entity may not perform PDCCH monitoring in a duration that is not a complete PDCCH occasion in which all PDCCH occasions are included in the active time.

Meanwhile, for the first UE, a DRX (e.g., first DRX) operation for a link (e.g., a Uu link, hereinafter, a first link) between the network and the UE may be configured. Also, D2D communication may be configured for the first UE and a DRX (e.g., second DRX) operation for a D2D communication link (e.g., a sidelink or a PC5 link, hereinafter, a second link) may be configured. That is, the first UE may be a UE that performs a sidelink transmission on the second link for the second UE and may also be a UE that performs a downlink reception from the base station (or the network) or an uplink transmission to the base station.

The second DRX operation includes a DRX operation according to a resource allocation method for the second UE (i.e., a second link Rx UE) by the first UE (i.e., a second link Tx UE). For example, the second DRX operation may include a DRX operation when the first UE dynamically schedules a sidelink data transmission for the second UE or when the first UE schedules the sidelink data transmission using a configured grant method, such as GF or SPS, for the second UE. Here, the aforementioned resource allocation method for the second UE needs to be distinguished from the resource allocation method for the first UE (i.e., a network scheduling-based mode 1 or a non-network scheduling-based mode 2).

Hereinafter, examples of the present disclosure for the first DRX operation for the first link for the first UE are described.

According to the present disclosure, in terms of the first DRX operation for the first link (e.g., a Uu link) with the base station of the first UE, an operation related to the first timer and the second timer for HARQ retransmission may be defined as follows.

The first timer may be a timer that starts after the first UE transmits sidelink HARQ feedback information to the base station and operates until a point in time at which resource allocation information for sidelink HARQ retransmission is expected to be received from the base station. That is, a time duration defined by the first timer may correspond to a time duration in which the first UE expects to not receive resource allocation information from the base station. For example, the first timer may correspond to the aforementioned drx-HARQ-RTT-TimerSL. That is, the first UE may be in a sleep state while the first timer operates after transmitting the sidelink HARQ feedback information (e.g., NACK) in the uplink. Also, while the first timer operates, the first UE may not monitor the PDCCH (i.e., the PDCCH that includes resource allocation information for sidelink HARQ retransmission) from the base station. After the first timer expires, the first UE may resume PDCCH monitoring.

The second timer may be a timer that starts after the first timer expires or after the first UE transmits HARQ feedback information to the base station and operates until a duration in which resource allocation information for sidelink HARQ retransmission is expected to be received from the base station. That is, a time duration defined by the second timer may correspond to a time duration in which the first UE expects to receive resource allocation information from the base station. For example, the second timer may correspond to the aforementioned drx-RetransmissionTimerSL. That is, after the first UE transmits sidelink HARQ feedback information (e.g., NACK) to the base station in the uplink, the first UE may wake up while sleeping during the first timer. Alternatively, after the first UE may transmit sidelink HARQ feedback information (e.g., NACK) to the base station in the uplink, the first UE may monitor the PDCCH (i.e., the PDCCH that includes resource allocation information for sidelink HARQ retransmission) from the base station while the second timer operates.

The sidelink HARQ feedback information (e.g., NACK) transmitted from the first UE to the base station in the uplink may be based on HARQ feedback information (e.g., NACK) from the second UE with respect to sidelink data (e.g., PSSCH) that is transmitted from the first UE to the second UE.

For example, the first UE may transmit, to the base station, sidelink HARQ feedback information indicating NACK in the following cases:
  when receiving a NACK signal from a unicast second UE;
  when failing in receiving an ACK or NACK signal from the unicast second UE;
  Here, the first UE may designate a specific wireless resource of a sidelink feedback channel as a resource for transmitting the ACK or NACK signal while transmitting the PSCCH and the PSSCH to the second UE. For example, based on a resource location of the PSSCH that is transmitted from the first UE to the second UE, time and frequency resources used for the second UE to transmit the ACK/NACK signal may be determined according to minimum ACK transmission interval information. Since the first UE is all aware of the PSSCH resource location and minimum ACK transmission interval information, the first UE may be aware when and at which frequency location ACK or NACK for sidelink data (i.e., the PSSCH) transmitted by the first UE is to be transmitted from the second UE. Therefore, the first UE may verify a case in which the second UE does not transmit any sidelink HARQ feedback information.

Groupcast: when receiving a NACK signal from the second UE.

HARQ feedback for downlink data (e.g., PDSCH) received by the first UE from the base station needs to be distinguished from HARQ feedback delivered by the first UE to the base station (e.g., through the PUCCH and/or the PUSCH) in the uplink after the first UE receives, from the second UE, SL HARQ feedback for the sidelink data (e.g., PSSCH) transmitted to the second UE. Hereinafter, that the first UE includes the HARQ feedback information (e.g., NACK) received from the second UE in a form of uplink control information (UCI) in the PUCCH and/or PUSCH and transmits the same to the base station" is referred to as an "uplink transmission including SL HARQ feedback".

Hereinafter, examples of the present disclosure related to a DRX operation associated with SL HARQ retransmission of the first UE are described.

In the following examples, when the first UE has data (i.e., SL MAC PDU) to be transmitted in the SL, it is assumed that the HARQ process (e.g., SL HARQ process) for the corresponding SL MAC PDU is determined.

Also, SL data transmitted from the first UE may be transmitted to the second UE based on an SL grant (e.g., PSCCH and/or PSSCH scheduling information) that is provided from the base station through the PDCCH (e.g., SL-RNTI-scrambled PDCCH) indicating SL transmission.

When the DRX is configured for the first UE, an active time may include a case in which the second timer operates. Here, an active time of the first UE is not limited only to the case in which the second timer operates.

When the DRX is configured for the first UE, the MAC entity of the first UE may operate as follows.

1> if the PDCCH indicating SL transmission is received from the base station:
  2> may start the first timer (e.g., drx-HARQ-RTT-TimerSL) related to the HARQ process of the corresponding SL MAC PDU from a first time unit after the end of the uplink transmission that includes the SL HARQ feedback for the SL MAC PDU.
  2> may stop the second timer (e.g., drx-RetransmissionTimerSL) related to the HARQ process of the corresponding SL MAC PDU.
1> if any first timer (drx-HARQ-RTT-TimerSL) expires,
  2> may start the second timer (e.g., drx-RetransmissionTimerSL) related to the HARQ process of the corresponding SL MAC PDU from the first time unit after the first timer (e.g., drx-HARQ-RTT-TimerSL) expires.
  2> may allow only SL-RNTI-scrambled PDCCH monitoring only in a duration in which the second timer is in progress.
1> if an uplink transmission including SL HARQ feedback for the SL MAC PDU is performed:
  2> if the base station is capable of identifying the related HARQ process based on a resource location of the corresponding HARQ feedback (e.g., NACK):
  3> may start the second timer (e.g., drx-RetransmissionTimerSL) related to the HARQ process of the corresponding SL MAC PDU from the first time unit after the end of uplink transmission that includes SL HARQ feedback for the SL MAC PDU.
  2> if the base station is incapable of identifying the related HARQ process based on a resource location of the corresponding HARQ feedback (e.g., NACK):
  3> may start a single second timer (e.g., drx-RetransmissionTimerSL) for all HARQ processes for the sidelink from the first time unit after the end of uplink transmission that includes SL HARQ feedback for the SL MAC PDU.
2> if the PDCCH indicating the SL transmission is received from the base station (e.g., if the PDCCH that includes an SL grant for retransmission of the corresponding SL MAC PDU is received according to the corresponding HARQ feedback (e.g., NACK)):
3> may stop the second timer (e.g., drx-RetransmissionTimerSL) related to the HARQ process of the corresponding SL MAC PDU.

Figure 15:
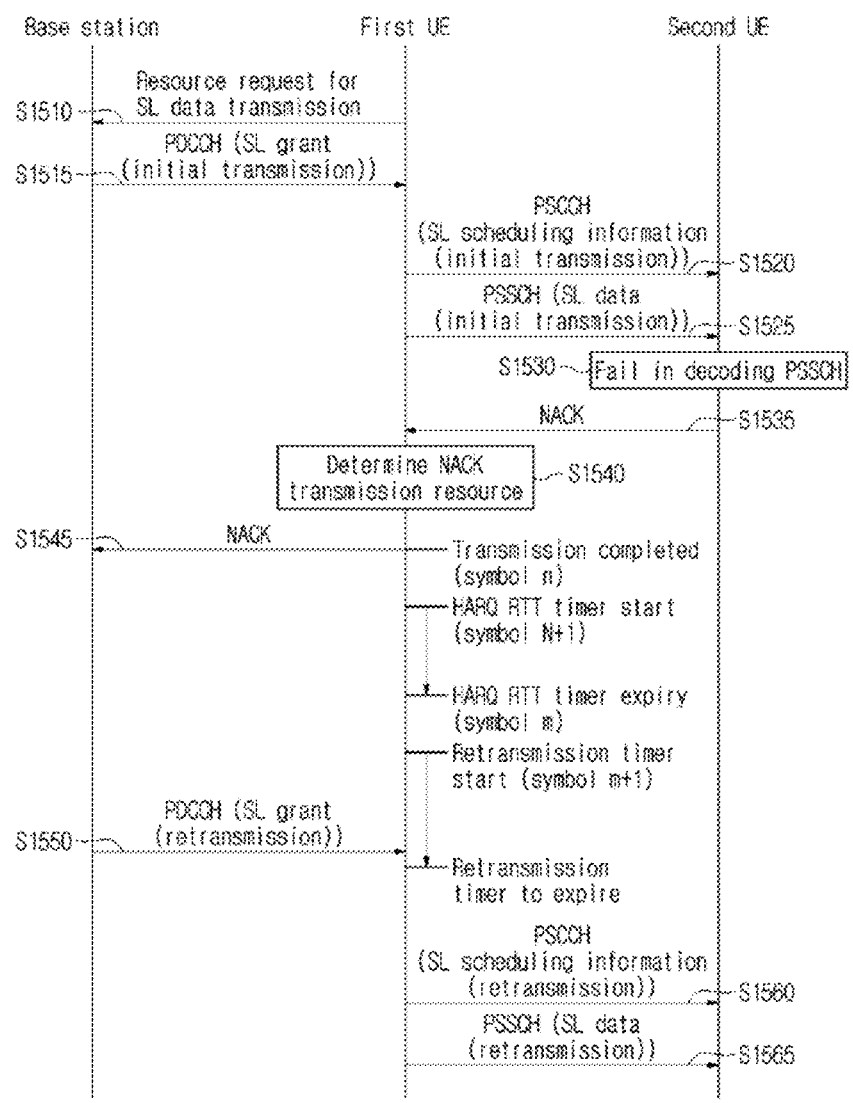
FIG. 15 illustrates an example of a DRX operation to which the present disclosure may apply.

FIG. 15 illustrates an example of a DRX operation to which the present disclosure may apply.

The example of FIG. 15 may correspond to a first DRX operation for a first link (e.g., a Uu link) with a base station of a first UE when a second DRX is configured in a second link (e.g., a sidelink) with a second UE for the first UE.

In operation S1510, the first UE may request a base station for a resource for SL data transmission. For example, when new data (or a transmission block (TB)) to be transmitted to the second UE is delivered from an upper layer to a MAC layer, the first UE may transmit resource request information to the base station.

For example, the resource request information may include a scheduling request (SR), a buffer status report (BSR), and the like. The scope of the present disclosure is not limited to the detailed example of the resource request information, and may include any control information used for the first UE to request the base station to allocate an SL resource for data to be transmitted to the second UE.

In operation S1515, the first UE may receive SL grant information from the base station through the PDCCH. The SL grant may include SL resource allocation information for data that the first UE desires to transmit to the second UE. Here, the SL grant may include resource allocation information for an initial transmission of new data. Also, the PDCCH may be an SL-RNTI-scrambled PDCCH. Alternatively, the SL grant may include resource allocation information for a periodic transmission of new data and information indicating an activation status. In this case, the PDCCH may be the SL-CS-RNTI-scrambled PDCCH. For the periodic transmission, the base station may initially configure a portion of the corresponding resource allocation in the first UE through RRC signaling before transmitting the PDCCH. The resource allocation information may include period information.

In operation S1520, the first UE may transmit SL scheduling information (e.g., SCI) to the second UE through a PSCCH. The SL scheduling information may include SL resource allocation information on the PSSCH for the initial transmission of the new data in the sidelink.

In operation 1525, the first UE may transmit SL data to the second UE through the PSSCH. Here, the SL data may correspond to the initial transmission of the new data. The second UE may receive the PSSCH in the corresponding resource based on the PSSCH transmission resource indicated by the SL scheduling information through the PSCCH from the first UE.

In operation S1530, the second UE may fail in decoding the PSSCH. In this case, in operation S1535, the second UE may generate NACK as SL HARQ feedback information and may transmit the NACK to the first UE.

In operation S1540, the first UE may determine a resource for NACK transmission. In operation S1545, the first UE may transmit the NACK to the base station. For example, the first UE may generate NACK information in a form of UCI based on NACK that is SL HARQ feedback information delivered from the second UE. Also, the first UE may determine an uplink resource (e.g., a PUCCH and/or PUSCH transmission resource) through which NACK information in the form of UCI is to be transmitted and may transmit the NACK to the base station in the determined resource. That is, the NACK transmitted from the first UE to the base station may refer to requesting a resource allocation for retransmitting the same data (i.e., sidelink data that the second UE fails in decoding) from the first UE to the second UE.

The MAC entity of the first UE may start the first timer (e.g., drx-HARQ-RTT-TimerSL) related to the HARQ process of the corresponding SL MAC PDU in the first time unit (e.g., a symbol n+1) after a time unit (e.g., a symbol n) after the end of uplink transmission that includes SL HARQ feedback for the SL MAC PDU. Also, the MAC entity of the first UE may stop the second timer if the second timer (e.g., drx-RetransmissionTimerSL) related to the HARQ process of the corresponding SL MAC PDU operates.

Until the first timer (e.g., drx-HARQ-RTT-TimerSL) expires, the first UE may maintain a sleep state and may not perform PDCCH monitoring.

If the first timer (e.g., drx-HARQ-RTT-TimerSL) expires, the MAC entity of the first UE may start the second timer (e.g., drx-RetransmissionTimerSL) related to the HARQ process of the corresponding SL MAC PDU in the first time unit (e.g., a symbol m+1) after a time unit (e.g., a symbol m) in which the first timer (e.g., drx-HARQ-RTT-TimerSL) expires.

Until the second timer (e.g., drx-RetransmissionTimerSL) expires, the first UE may perform PDCCH monitoring. For example, the first UE may monitor the SL-RNTI-scrambled PDCCH. For example, only when the second timer (e.g., drx-RetransmissionTimerSL) is in progress, the first UE may be allowed to perform SL-RNTI-scrambled PDCCH monitoring.

In operation S1550, the first UE may receive SL grant information from the base station through the PDCCH. Here, the SL grant may include resource allocation information for retransmission of data that the second UE previously failed in decoding. Also, the PDCCH may include an SL-RNTI or SL-CS-RNTI-scrambled PDCCH.

A method of verifying whether SL resource allocation information transmitted using the PDCCH is a retransmission may differ based on a type of a scrambled RNTI.

The SL-RNTI-scrambled PDCCH may include a value corresponding to an SL HARQ process of which a retransmission is required and an NDI value. If an NDI value in the PDCCH is the same as a result of comparison to a previously received NDI value in the PDCCH, the UE may determine it as a retransmission. If the NDI value in the PDCCH is changed from the previously received NDI value in the PDCCH through comparison thereto, the UE may determine it as a new data transmission.

The SL-CS-RNTI-scrambled PDCCH may include a value corresponding to the SL HARQ process of which retransmission is required and an NDI value. If an NDI value in the PDCCH is 0, the UE may determine it as a retransmission. If the NDI value in the PDCCH is 1, the UE may determine it as a new data transmission. In the case of the SL-CS-RNTI-scrambled PDCCH, a point in time of the retransmission or the new data transmission may be determined as a subsequent transmission period point in time based on preconfigured period information.

In the case of receiving the PDCCH that instructs SL transmission from the base station before the second timer (e.g., drx-RetransmissionTimerSL) expires, the first UE may stop the second timer (e.g., drx-RetransmissionTimerSL) related to the HARQ process of the corresponding SL MAC PDU. Here, the PDCCH received while the second timer (e.g., drx-RetransmissionTimerSL) is in progress may include an SL grant for retransmission of the corresponding SL MAC PDU according to the HARQ feedback (e.g., NACK) transmitted in operation S1545.

In operation S1560, the first UE may transmit the SL scheduling information (e.g., SCI) to the second UE through the PSCCH. The SL scheduling information may include SL resource allocation information on the PSSCH for retransmission of sidelink data.

In operation S1565, the first UE may transmit the SL data to the second UE through the PSSCH. Here, the SL data may correspond to retransmission of data that the second UE previously failed in decoding. The second UE may receive the PSSCH in the corresponding resource based on the PSSCH transmission resource indicated by the SL scheduling information received through the PSCCH from the first UE.

Figure 16:
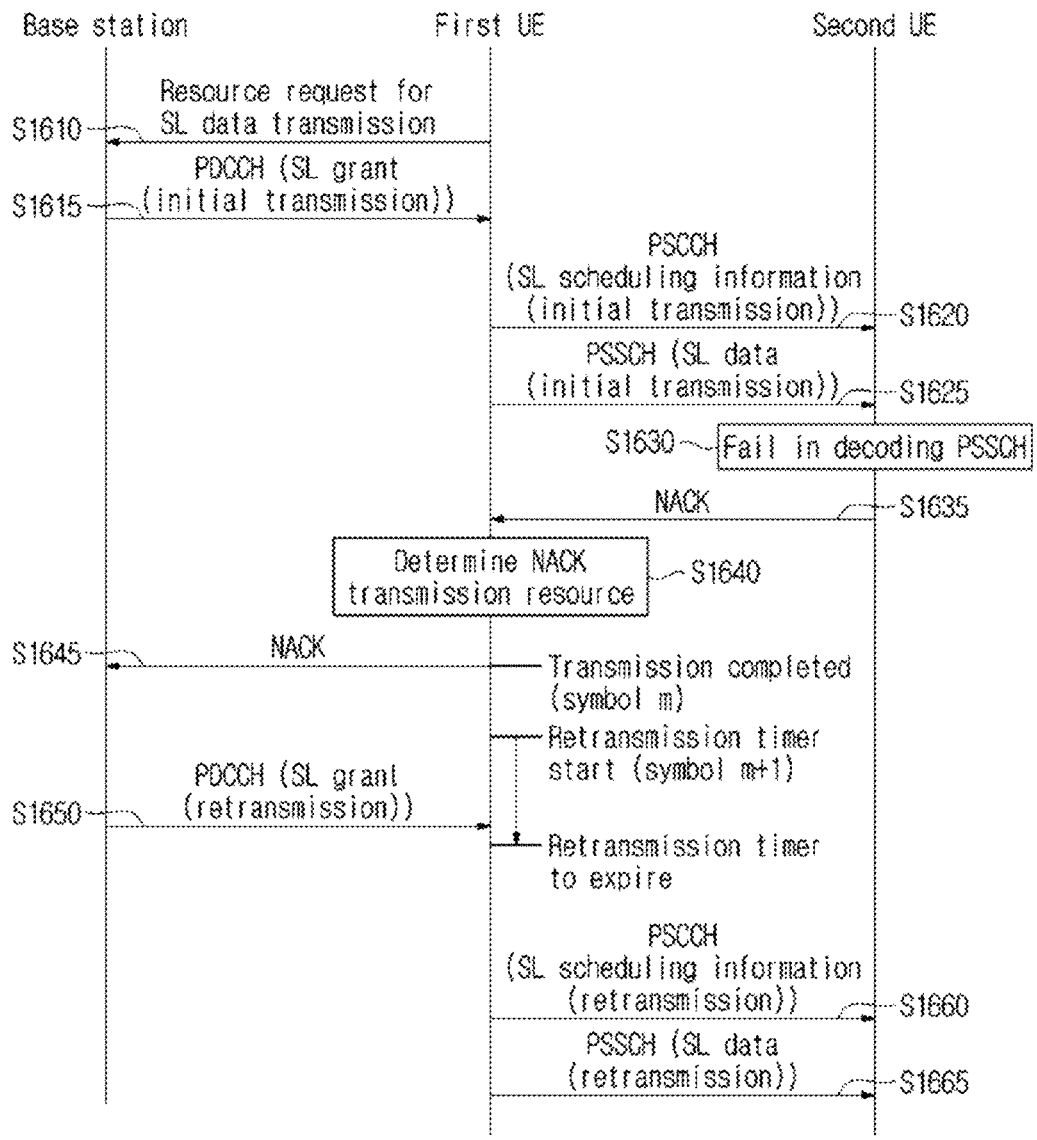
FIG. 16 illustrates an additional example of a DRX operation to which the present disclosure may apply.

FIG. 16 illustrates an additional example of a DRX operation to which the present disclosure may apply.

Operations S1610 to S1665 in the example of FIG. 16 correspond to operations S1510 to S1565 in the example of FIG. 15 and thus, further description is omitted.

In operation S1640, the first UE may determine a resource for NACK transmission. In operation S1645, the first UE may transmit the NACK to the base station. For example, the first UE may determine an uplink resource for transmitting NACK information in the form of UCI based on the NACK that is SL HARQ feedback information from the second UE. The first UE may transmit the NACK to the base station through the PUCCH and/or PUSCH in the determined uplink resource.

Here, the SL HARQ feedback transmission resource determined by the first UE may be a resource distinguished for each of a plurality of sidelink HARQ processes. For example, the different HARQ processes may be distinguished based on at least one of a time resource, a frequency resource, and a code resource used to transmit SL HARQ feedback. That is, an SL HARQ feedback transmission resource location may indicate a related HARQ process. Therefore, the base station may identify which HARQ process is related to SL MAC PDU transmission/retransmission based on a resource location (e.g., a combination of at least one of time, frequency, and code resources) at which SL HARQ feedback is received.

Alternatively, the SL HARQ feedback transmission resource determined by the first UE may be a resource common for a plurality of sidelink HARQ processes. For example, a resource used to transmit SL HARQ feedback may be determined independently of the HARQ process. In this case, the base station may not identify which HARQ process is related to the SL MAC PDU transmission/retransmission only with SL HARQ feedback.

When the first UE performs uplink transmission that includes SL HARQ feedback for the SL MAC PDU for the base station in operation S1645, a DRX related operation of the first UE may be performed as follows.

For example, when the base station is capable of identifying a related HARQ process based on a resource location of SL HARQ feedback (e.g., NACK) that the first UE transmits to the base station, the MAC entity of the first UE may start the second timer (e.g., RetransmissionTimerSL) related to the HARQ process of the corresponding SL MAC PDU in the first time unit (e.g., a symbol m+1) after a time unit (e.g., a symbol m) after the end of uplink transmission that includes SL HARQ feedback for the SL MAC PDU.

Alternatively, if the base station is incapable of identifying the related HARQ process based on a resource location of SL HARQ feedback (e.g., NACK) that the first UE transmits to the base station, the MAC entity of the first UE may start a single second timer (e.g., RetransmissionTimerSL) that is common for all HARQ processes for the sidelink in the first time unit (e.g., a symbol m+1) after a time unit (e.g., a symbol m) of the end of uplink transmission that includes SL HARQ feedback for the SL MAC PDU.

The first UE may perform PDCCH monitoring until the second timer (e.g., drx-RetransmissionTimerSL) expires. For example, the first UE may monitor the SL-RNTI-scrambled PDCCH. For example, only while the second timer (e.g., drx-RetransmissionTimerSL) is in progress, the first UE may be allowed to perform SL-RNTI-scrambled PDCCH monitoring.

Dissimilar to the example of FIG. 15 of starting the first timer (e.g., drx-HARQ-RTT-TimerSL) after performing SL HARQ feedback transmission of the first UE, the second timer (e.g., drx-RetransmissionTimerSL) may start after performing SL HARQ feedback transmission of the first UE in the example of FIG. 16. That is, when the first UE receives NACK for sidelink data from the second UE and transmits the NACK to the base station, the first UE may monitor resource allocation information (i.e., PDCCH) for retransmission of sidelink data corresponding to the corresponding NACK from a subsequent time unit.

Figure 17:
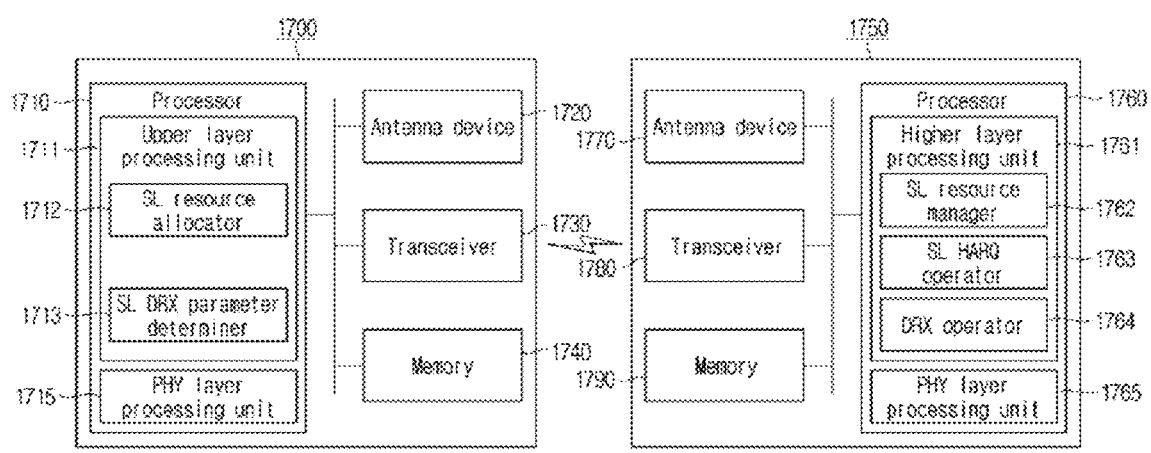
FIG. 17 is a diagram illustrating a configuration of a base station device and a terminal device according to the present disclosure.

FIG. 17 is a diagram illustrating a configuration of a base station device and a terminal device according to the present disclosure.

A base station device 1700 may include a processor 1710, an antenna device 1720, a transceiver 1730, and a memory 1740.

The processor 1710 may perform baseband-related signal processing and may include an upper layer processing unit 1711 and a physical (PHY) layer processing unit 1715. The upper layer processing unit 1711 may process an operation of a MAC layer, an RRC layer, or more upper layers. The PHY layer processing unit 1715 may process an operation (e.g., uplink received signal processing, downlink transmission signal processing, etc.) of a PHY layer. The processor 1710 may also control the overall operation of the base station device 1700, in addition to performing the baseband-related signal processing.

The antenna device 1720 may include at least one physical antenna. If the antenna device 1720 includes a plurality of antennas, multiple input multiple output (MIMO) transmission and reception may be supported. The transceiver 1730 may include a radio frequency (RF) transmitter and an RF receiver. The memory 1740 may store operation processed information of the processor 1710, software, an operating system (OS), an application, etc., associated with an operation of the base station device 1700, and may include a component, such as a buffer.

The processor 1710 of the base station device 1700 may be configured to implement an operation of a base station in the examples set forth herein.

For example, the upper layer processing unit 1711 of the processor 1710 of the base station device 1700 may include an SL resource allocator 1712 and a DRX parameter determiner 1713.

The SL resource allocator 1712 may allocate a sidelink resource used for the terminal device 1750 to perform an initial transmission for another terminal device (e.g., an SL Rx UE) in response to a sidelink resource request from the terminal device 1750 (e.g., an SL Tx UE).

Also, the SL resource allocator 1712 may allocate a sidelink resource used for the terminal device 1750 to perform retransmission for another terminal device (e.g., an SL Rx UE) based on SL HARQ feedback information from the terminal device 1750 (e.g., an SL Tx UE).

The SL resource allocator 1712 may generate sidelink resource allocation information (e.g., an SL grant) and may deliver the same to the PHY layer processing unit 1715.

The DRX parameter determiner 1713 may determine a DRX parameter that includes a first timer and a second timer to be applied to the terminal device 1750 that performs an SL transmission and may provide DRX configuration information including the same to the terminal device 1750.

The PHY layer processing unit 1715 may receive a sidelink resource request and/or SL HARQ feedback information from the terminal device 1750 and may deliver the same to the upper layer processing unit 1711.

Also, the PHY layer processing unit 1715 may transmit sidelink resource allocation information (e.g., an SL grant) delivered from the SL resource allocator 1712 of the upper layer processing unit 1711 to the first terminal device 1750 through a PDCCH. Here, the PDCCH may be SL-RNTI scrambled.

The terminal device 1750 may include a processor 1760, an antenna device 1770, a transceiver 1780, and a memory 1790.

The processor 1760 may perform baseband-related signal processing and may include an upper layer processing unit 1761 and a PHY layer processing unit 1765. The upper layer processing unit 1761 may process an operation of a MAC layer, an RRC layer, or more upper layers. The PHY layer processing unit 1765 may process an operation (e.g., downlink received signal processing, uplink transmission signal processing, etc.) of a PHY layer. The processor 1760 may also control the overall operation of the terminal device 1750 in addition to performing the baseband-related signal processing.

The antenna device 1770 may include at least one physical antenna. If the antenna device 1770 includes a plurality of antennas, MIMO transmission and reception may be supported. The transceiver 1780 may include an RF transmitter and an RF receiver. The memory 1790 may store operation processed information of the processor 1760, software, an OS, an application, etc., associated with an operation of the terminal device 1750, and may include a component, such as a buffer.

The processor 1760 of the terminal device 1750 may be configured to implement an operation of a UE in the examples set forth herein.

For example, the upper layer processing unit 1761 of the processor 1760 of the terminal device 1750 may include an SL resource manager 1762, an SL HARQ operator 1763, and a DRX operator 1764.

In response to occurrence of data to be transmitted from the terminal device 1750 (e.g., an SL Tx UE) to another terminal device (e.g., an SL Rx UE), the SL resource manager 1762 may generate SL resource request information to be transmitted to the base station device 1700. The 9 generated SL resource request information may be delivered to the PHY layer processing unit 1765.

Also, the SL resource manager 1762 may determine a sidelink resource used for the terminal device 1750 to perform a sidelink transmission (e.g., PSCCH and/or PSSCH transmission) for another terminal device (e.g., an SL Rx UE) based on SL resource allocation information (e.g., an SL grant) provided from the base station device 1700. The SL resource allocation information may be for initial transmission and/or retransmission of sidelink. The determined sidelink resource may be instructed to the PHY layer processing unit 1765.

The SL HARQ operator 1763 may receive SL HARQ feedback information from the other UE (e.g., through an SL feedback channel) for SL data (e.g., PSSCH) transmitted from the terminal device 1750 to the other UE. The SL HARQ operator 1763 may generate UCI formatted SL HARQ feedback information to be transmitted through an uplink resource (e.g., PUCCH and/or PUSCH resource) based on the SL HARQ feedback information received from the other UE. Also, the SL HARQ operator 1763 may determine a combination of at least one of time, frequency, and code resources used to transmit the UCI-formatted SL HARQ feedback information. SL HARQ feedback information transmission resources may be configured with resources distinguished for different HARQ processes, and may be configured with a resource common for a plurality of HARQ processes. The generated UCI-formatted SL HARQ feedback information and transmission resource information related thereto may be delivered to the PHY layer processing unit 1765.

The DRX operator 1764 may start a first timer (e.g., drx-HARQ-RTT-TimerSL) in a subsequent time unit immediately after transmitting SL HARQ feedback information to the base station device 1700 and may start a second timer (e.g., drx-RetransmissionTimerSL) in a subsequent time unit immediately after the first timer expires. The DRX operator 1764 may indicate the PHY layer processing unit 1765 to not perform PDCCH monitoring from the base station device 1700 while the first time operates and to perform PDCCH monitoring (e.g., SL-RNTI-scrambled PDCCH monitoring) from the base station device 1700 while the second timer operates. Also, the DRX parameter of the terminal device 1750 that includes the first timer and the second timer may be configured by the base station device 1700 and may be provided to the terminal device 1750 as DRX configuration information.

Alternatively, the DRX operator 1764 may start the second timer (e.g., drx-RetransmissionTimerSL) in a subsequent time unit after transmitting SL HARQ feedback information to the base station device 1700. The DRX operator 1764 may indicate the PHY layer processing unit 1765 to perform PDCCH monitoring from the base station device 1700 while the second timer operates.

The PHY layer processing unit 1765 may perform PDCCH (e.g., SL-RNTI-scrambled PDCCH) monitoring that includes the SL resource allocation information received from the base station device 1700 and may deliver the received SL resource allocation information to the upper layer processing unit 1761.

Also, the PHY layer processing unit 1765 may transmit SL resource allocation request information delivered from the SL resource manager 1762 of the upper layer processing unit 1761 to the base station device 1700 through a PUCCH and/or a PUSCH. Also, the same may be transmitted to the base station device 1700 through the PUCCH and/or the PUSCH based on UCI-formatted SL HARQ feedback information delivered from the SL HARQ operator 1763 and transmission resource information related thereto.

The description related to a base station and a UE made in the examples may be equally applied to an operation of the base station device 1700 and the terminal device 1750 and repeated description is omitted.

While the exemplary method of the present disclosure is described as a series of operations, for clarity of description, this does not limit the order of steps. When needed, the steps may be performed at the same time or in a different order. In order to implement the method according to the present disclosure, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes a software or machine executable instructions (for example, operating system, application, firmware, program, etc.) for enabling to implement operations according to the methods of the various examples, and a device or a non-transitory computer-readable medium executable on a computer storing such a software or instructions. Instructions available to program a processing system that performs features described herein may be stored on/in a storage medium or a computer-readable storage medium and the features described herein may be implemented using a computer program product that includes such storage medium. Storage media may include a high-speed random access memory, such as dynamic random access memory (DRAM), static RAM (SRAM), DDR RAM, or other random access solid state memory devices, and without being limited thereto, may include non-volatile memory, such as at least one magnetic disk storage device, optical disk storage device, flash memory device, or other non-volatile solid stage devices. Memory optionally includes at least one storage device remotely present from processor(s). Memory or, alternately, non-volatile memory device(s) in memory may include non-transitory computer-readable storage medium. Features described herein may be arbitrarily stored in one of machine-readable media to control hardware of the processing system. The processing system may be integrated into software and/or firmware that interlocks with other mechanisms using results according to the examples of the present disclosure. Such software or firmware may include an application code, a device driver, an OS, and an execution environment/container, but is not limited thereto.

The examples of the present disclosure may apply to various wireless communication systems.

What is claimed is:

1. A method comprising:
    receiving, by a first wireless user device from a second wireless user device, sidelink hybrid automatic repeat request (HARQ) feedback information associated with sidelink data that is transmitted from the first wireless user device to the second wireless user device;
    transmitting, by the first wireless user device to a base station, a sidelink HARQ negative acknowledgment (NACK) associated with the sidelink HARQ feedback information;
    starting, in a symbol after an end of a transmission of the HARQ NACK, a first timer;
    starting, in a symbol after an expiry of the first timer, a second timer; and
    during a discontinuous reception (DRX) active time and while the second timer is running, receiving, from the base station via a downlink control channel, an indication of a sidelink data retransmission,
    wherein the symbol after the end of the transmission of the HARQ NACK is symbol 'n+1' that immediately follows symbol 'n' in which the transmission of the HARQ NACK ends, and
    wherein the symbol after the expiry of the first timer is symbol 'm+1' that immediately follows symbol 'm' in which the expiry of the first timer occurs.

2. The method of claim 1, wherein a physical uplink control channel (PUCCH) resource is configured for the sidelink HARQ NACK, and
    wherein the transmitting the sidelink HARQ NACK comprises transmitting the sidelink HARQ NACK via the PUCCH resource.

3. The method of claim 1, further comprising operating the DRX active time during the second timer is running.

4. The method of claim 1, further comprising:
    after the expiry of the first timer, transitioning, by the first wireless user device, to the DRX active time, wherein the first wireless user device is in a DRX inactive time while the first timer is running.

5. The method of claim 1, further comprising:
    receiving, by the first wireless user device from the base station, an initial sidelink grant via a downlink control channel; and
    transmitting, by the first wireless user device to the second wireless user device:
        sidelink scheduling information via a sidelink control channel; and
        the sidelink data via a sidelink shared channel,
    wherein the sidelink HARQ feedback information indicates a sidelink HARQ NACK.

6. The method of claim 1, further comprising:
    receiving, by the first wireless user device from the base station, DRX configuration information, wherein the DRX configuration information comprises:
        the first timer;
        the second timer;
        a DRX cycle;
        a DRX on-duration timer; and
        a DRX inactivity timer.

7. The method of claim 1, wherein the first timer is associated with a DRX HARQ round trip time for a sidelink HARQ process, and
    wherein the second timer is associated with a DRX retransmission time for the sidelink HARQ process.

8. The method of claim 1, further comprising stopping the second timer after starting the first timer.

9. The method of claim 1, further comprising:
    receiving, by the first wireless user device from the base station, a sidelink grant via a downlink control channel scrambled based on a sidelink-radio network temporary identifier (SL-RNTI), wherein the sidelink grant indicates a transmission of the sidelink data, and wherein a sidelink HARQ process is associated with:
        the sidelink data;
        the first timer; and
        the second timer.

10. A first wireless user device comprising:
an antenna;
one or more processors; and
memory storing instructions that, when executed by the one or more processors, cause the first wireless user device to:
- receive, from a second wireless user device, sidelink hybrid automatic repeat request (HARQ) feedback information associated with sidelink data that is transmitted from the first wireless user device to the second wireless user device;
- transmit, to a base station, a sidelink HARQ negative acknowledgment (NACK) associated with the sidelink HARQ feedback information;
- start, in a symbol after an end of a transmission of the HARQ NACK, a first timer;
- start, in a symbol after an expiry of the first timer, a second timer; and
- during a discontinuous reception (DRX) active time and while the second timer is running, receive, from the base station via a downlink control channel, an indication of a sidelink data retransmission,
- wherein the symbol after the end of the transmission of the HARQ NACK is symbol 'n+1' that immediately follows symbol 'n' in which the transmission of the HARQ NACK ends, and
- wherein the symbol after the expiry of the first timer is symbol 'm+1' that immediately follows symbol 'm' in which the expiry of the first timer occurs.

11. The first wireless user device of claim 10, wherein a physical uplink control channel (PUCCH) resource is configured for the sidelink HARQ NACK, and
wherein the instructions, when executed by the one or more processors, cause the first wireless user device to transmit the sidelink HARQ NACK by transmitting the sidelink HARQ NACK via the PUCCH resource.

12. The first wireless user device of claim 10, wherein the instructions, when executed by the one or more processors, cause the first wireless user device to operate the DRX active time during the second timer is running.

13. The first wireless user device of claim 10, wherein the instructions, when executed by the one or more processors, cause the first wireless user device to:
after the expiry of the first timer, transition to the DRX active time, wherein the first wireless user device is in a DRX inactive time while the first timer is running.

14. The first wireless user device of claim 10, wherein the instructions, when executed by the one or more processors, cause the first wireless user device to:
receive, from the base station, an initial sidelink grant via a downlink control channel; and
transmit, to the second wireless user device:
sidelink scheduling information via a sidelink control channel; and
the sidelink data via a sidelink shared channel,
wherein the sidelink HARQ feedback information indicates a sidelink HARQ NACK.

15. The first wireless user device of claim 10, wherein the instructions, when executed by the one or more processors, cause the first wireless user device to:
receive, from the base station, DRX configuration information, wherein the DRX configuration information comprises:
the first timer;
the second timer;
a DRX cycle;
a DRX on-duration timer; and
a DRX inactivity timer.

16. The first wireless user device of claim 10, wherein the first timer is associated with a DRX HARQ round trip time for a sidelink HARQ process, and
wherein the second timer is associated with a DRX retransmission time for the sidelink HARQ process.

17. The first wireless user device of claim 10, wherein the instructions, when executed by the one or more processors, cause the first wireless user device to stop the second timer after starting the first timer.

18. The first wireless user device of claim 10, wherein the instructions, when executed by the one or more processors, cause the first wireless user device to:
receive, from the base station, a sidelink grant via a downlink control channel scrambled based on a sidelink-radio network temporary identifier (SL-RNTI), wherein the sidelink grant indicates a transmission of the sidelink data, and wherein a sidelink HARQ process is associated with:
the sidelink data;
the first timer; and
the second timer.

* * * * *